US005498849A

United States Patent [19]
Isshiki et al.

[11] Patent Number: 5,498,849
[45] Date of Patent: Mar. 12, 1996

[54] STRUCTURE OF METAL CONTAINER HAVING TRUNK PIPE AND BRANCH PIPE, AND MANUFACTURING METHOD AND APPARATUS THEREFOR

[75] Inventors: Osamu Isshiki; Masaki Murashita, both of Hitachi; Osamu Matsushima, Hitachioota; Sadao Nakagawa, Hitachi; Seizo Nakano, Mito; Koji Goto, Hitachi; Masayoshi Hashiura, Hitachi; Yutaka Kobayashi, Hitachi; Takashi Satoh, Hitachi; Katsuro Ota, Hitachi; Hideaki Kikuchi, Hitachi; Takashi Sato, Kitaibaraki; Shinji Fukuda, Hitachi, all of Japan

[73] Assignee: Hitachi, Ltd., Tokyo, Japan

[21] Appl. No.: 282,306

[22] Filed: Jul. 29, 1994

Related U.S. Application Data

[62] Division of Ser. No. 760,890, Sep. 17, 1991, Pat. No. 5,444,206.

[30] Foreign Application Priority Data

| Sep. 17, 1990 | [JP] | Japan | 2-243995 |
| Sep. 17, 1990 | [JP] | Japan | 2-243996 |
| Sep. 17, 1990 | [JP] | Japan | 2-246987 |
| Sep. 19, 1990 | [JP] | Japan | 2-247010 |
| Sep. 19, 1990 | [JP] | Japan | 2-247509 |
| Oct. 16, 1990 | [JP] | Japan | 2-290169 |
| Oct. 26, 1990 | [JP] | Japan | 2-290168 |
| Nov. 30, 1990 | [JP] | Japan | 2-329013 |

[51] Int. Cl.⁶ .................................................. B23K 26/00
[52] U.S. Cl. .................. 219/121.64; 219/121.63; 219/121.84; 219/121.78; 219/121.82
[58] Field of Search .................. 219/121.63, 121.64, 219/121.82, 121.85, 121.67, 121.72, 121.76, 121.84, 121.48, 121.58, 158–160; 228/170

[56] References Cited

U.S. PATENT DOCUMENTS

| 2,272,698 | 2/1942 | Garret et al. |
| 3,251,122 | 5/1966 | Voteler |
| 3,742,182 | 6/1973 | Saunders ..................... 219/121 LM |
| 3,870,288 | 3/1975 | McLarnon |

(List continued on next page.)

FOREIGN PATENT DOCUMENTS

| 429933 | 12/1938 | Belgium. |
| 60382 | 1/1982 | European Pat. Off.. |
| 0060382 | 9/1982 | European Pat. Off.. |
| 159723 | 4/1985 | European Pat. Off.. |
| 0206027 | 12/1986 | European Pat. Off.. |
| 0321686 | 6/1989 | European Pat. Off.. |

(List continued on next page.)

OTHER PUBLICATIONS

Patent Abstracts of Japan, vol. 9, No. 231 (M–414)(1954) 18 Sep. 1985 & JP–A–60 87 989 (Toshiba K.K.) 17 May 1985 "abstract".
Patent Abstracts of Japan, vol. 12, No. 190 (M–704)(3037) 3 Jun. 1988 & JP–A 62–296 990 (Hitachi Ltd) 24 "abstract".
Patent Abstracts of Japan, vol. 006, No. 020 (M–110) 5 Feb. 1982 & JP–A 56 139 295 (Mitsubishi Heavy Industrie Ltd) 30 Oct. 1981 "abstract".
Proceeding of LAMP'97, Osaka (May, 1987).

*Primary Examiner*—Mark H. Paschall
*Attorney, Agent, or Firm*—Antonelli, Terry, Stout & Kraus

[57] ABSTRACT

A welded metal container for a sheath 1 or 1A of gas insulated switch gear comprises a trunk pipe 2, 21 and a branch pipes 3, 31, 32 welded to the trunk pipe 2,21 by arc welding A or laser beam welding LB and flanges welded to the each end portion of the trunk pipe 2, 21 and branch pipes 3, 31, 32 by the laser beam welding. After the arc welding A, the ends of trunk pipe 1, 21 and branch pipes 3, 31, 32 are machined precisely and flanges 4a, 4b, 4c, 4d, 4f and 4g are welded to the end portions of the trunk pipe 2, 21 and branch pipes 3, 31, 32.

7 Claims, 16 Drawing Sheets

U.S. PATENT DOCUMENTS

| | | |
|---|---|---|
| 3,882,299 | 5/1975 | Sciaky . |
| 4,177,371 | 12/1979 | Hoinig . |
| 4,504,729 | 3/1985 | Asono . |
| 4,566,623 | 1/1986 | Duffit . |
| 4,659,903 | 4/1987 | Berne et al. . |
| 4,698,480 | 10/1987 | Klingel ............................ 219/121 LG |
| 4,724,299 | 2/1988 | Hammeke .......................... 219/121.83 |
| 4,733,815 | 3/1988 | Sturm ...................................... 228/4.1 |
| 4,840,303 | 6/1989 | Fujii et al. ........................ 219/121.63 |
| 4,873,417 | 10/1989 | Moriyasu et al. .................. 219/121.6 |

FOREIGN PATENT DOCUMENTS

| | | |
|---|---|---|
| 2592824 | 7/1987 | France . |
| 6310074 | 1/1974 | Japan . |
| 56-139295 | 10/1981 | Japan . |
| 6087987 | 5/1982 | Japan . |
| 59-189092 | 10/1984 | Japan . |
| 60-87989 | 5/1985 | Japan . |
| 0159723 | 12/1985 | Japan . |
| 61-159272 | 7/1986 | Japan . |
| 62-296990 | 12/1987 | Japan . |

MACHINING PROCESS OF A PIPE AND FLANGES 611, 612

WELDING OF THE MAIN PIPE

BORING

614

$\varnothing d_0$
553
552

STRUCTURE OF METAL CONTAINER HAVING TRUNK PIPE AND BRANCH PIPE, AND MANUFACTURING METHOD AND APPARATUS THEREFOR

This application is a division of application Ser. No. 07/760,890, filed Sep. 17, 1991, now U.S. Pat. No. 5,444,206 issued Aug. 22, 1995.

BACKGROUND OF THE INVENTION

The present invention relates to a metal container having a trunk pipe and branch pipe, such as a sheath of gas insulated switch gear, and more particularly, to a structure of welded metal container having a trunk pipe and branch pipe welded thereto and flanges welded to the each end portion of the trunk pipe and branch pipe, and manufacturing method and apparatus therefor.

During manufacturing, a metal container having a trunk pipe and branch pipe, for example, a sheath of gas insulated switch gear which has a plurality of pipes welded to the trunk pipe, it is necessary to accommodate weld flanges to end portions of the branch pipe and trunk pipe. However arc welding is used for the above purpose. In the welding, however, this arc welding requires a complete penetration welding so as to ensure the gas-tightness. The flange faces have to be machined after welding when an accuracy is required. Laser welding is used for joining pipe and flanges, as disclosed in Japanese laid-open patent publication No. 59-189092/1984, Processing of LAMP '87, Osaka, May, 1987, pages 157–162, "Deep Penetration Welding with High Power Co Laser", HIRAMOTO et al, and Mitsubishi Denki Giho, No. 10, 1989, page 37–40.

The aforementioned prior art pays no attention to the working method, in which the joint between the flanges and trunk pipe is merely changed from the arc welding to the laser welding. No consideration is taken into the structure and manufacture of the actual metallic containers, namely the widely used metal container having a branch pipe such as the gas insulated switch gear sheath having branch pipes. Therefore, arc welding is still used for manufacturing the metallic container having a plurality of branch pipes.

When the trunk pipe and the flange are bonded by arc welding, the flange may fall down due to the welding heat and a restraint or support must be provided.

For example, with the following welding conditions:

diameter of the trunk pipe: 600 mm, length of the trunk pipe: 2,000 mm, thickness of the trunk pipe: 6 mm–12 mm, weld width (bead width): 6 mm–8 mm, the welded flange is inclined or drops by about 2 mm. Therefore, inaccurateness in the degree of parallelization and perpendicularity occurs. In order to enhance the accuracy of the container, the flange have to be machined after welded, and the machining results creates problems.

Unless the ends of the branch pipe and the trunk pipe are precisely machined after welding, it is difficult to weld the trunk pipe to the flanges. This makes it necessary to machine the ends, but the flanges are inevitably deformed when welded. Therefore, it is necessary to maintain the accuracy of the flange by machining the same so as to set the flatness of the flange surface and distance between flanges to suitable levels and to eliminate the inclination of the flange surface after welding operation. This raises a serious problem during production.

The prior art requires a large-sized machine for machining the flanges for a large container. This necessity dilutes the effects of accomplishing the machine before the welding. However, this dilution is not taken into consideration to raise another serious problem in case of the large sized container.

In addition, in conventional techniques, a recess of 0.2–3 mm in depth is provided in the flange, and an end portion of the pipe is inserted in this recess. A laser beam is applied to the portion to be welded, in the direction to carry out the laser welding of the workpieces while rotating the same.

The angle at which the laser beam is applied to the surfaces to be welded is about 3°–20°. That is, a laser beam is applied diagonally to the surfaces to be welded. Therefore, the depth of penetration of the flange and pipe is uneven, and perfect penetration bead weld cannot be obtained in some cases in one pass.

In general, the outer diameter of a pipe has tolerance of ±1% according to the Japanese Industrial Standards. Therefore, even when a recess of a nominal pipe diameter is cut in one surface of a flange, it becomes difficult to insert a pipe, the outer diameter of which has certain tolerance, in the recess in the flange or a clearance between the pipe and recess becomes large even if the pipe fits in the recess, so that such flange and pipe become in some cases unsuitable for welding.

Accordingly, if a pipe of about 50 mm (about 2 inches) in diameter is welded to a flange by using the above-described conventional welding techniques, the pipe can be inserted in the recess in the flange due to the small tolerance of this diameter and the welding can be carried out. However, when a large-sized pipe having a diameter of, for example, around 744 mm is used, the welding thereof to a flange cannot be done suitably in many cases since this pipe has tolerance of as large as ±7.4 mm.

A laser machining apparatus for cutting or welding a workpiece by making use of a laser beam from a laser oscillator is disclosed in, for example, Japanese Laid-Open Patent Publication No. 60-227987/1985.

A machining table is sequentially arranged thereon with a welding head, a cutting head and a heat treatment head and is underlaid by a laser oscillator so that the workpiece can be moved in the same direction as a laser beam outputted from the laser oscillator. Moreover, the welding head and the cutting head on the machining table can be moved at a right angle with respect to the output direction of the laser beam.

In machining application of the workpiece, either the welding head or the welding head and the cutting head are moved at a right angle with respect to the output direction of the laser beam so that the laser beam may not be obstructed but can enter the machining head. The workpiece is so moved that the workpiece may be positioned just below the machining head in operation.

Since the individual machining heads are independently fixed on the machining table in accordance with the prior art, the machining heads have to be moved each time according to the machining application of the workpiece, and the workpiece must be positioned just below the machining head in accordance with the machining application, thus raising a problem in the machinability. Moreover, the individual machining heads may be spaced at distances for accommodating small or large workpieces. As a result, a problem arises in that the system is of a large size. When the machining head once moved is returned to its initial position before a predetermined machining, it is necessary to align the optical axis of the laser beam coming from the laser oscillator and the center of a bend mirror which is disposed in the machining head to change the path of the aforementioned laser beam. This alignment is difficult, and it is seriously troublesome to position the moved machining head for each machining. Moreover, the aforementioned prior art does not take into consideration the cutting of the end face of the tubular container such as the bus of the gas insulation control apparatus nor into the correction of that gap between the pipe end and the flange groove, which never fails to occur in the actual welding, and the correction of the dislocation.

SUMMARY OF THE INVENTION

One object of the present invention is to provide a welded metal container, such as a sheath of an insulated switch gear, in which flanges are highly accurately joined, with a reduced number of steps to the individual ends of the trunk pipe and the branch pipe bonded to the trunk pipe by the welding operation.

To accomplish the object of the present invention, there is provided a welded metal container in which a metallic trunk pipe, and a branch pipe branched axially from the trunk pipe, are welded by arc welding or laser beam welding and in which flanges to be joined to the individual ends of the branch pipe and the trunk pipe are welded by a laser beam.

Another feature of the present invention resides in providing a method of producing tubular containers, capable of minimizing the welding deformation of even a branch pipe-carrying container in which flanges are joined to the end portions of a trunk pipe and branch pipes, reducing the time required for with a machining operation, which is carried out after the welding of flanges to pipes in a conventional method of this kind, omitted, and thereby obtaining a highly accurate welded tubular container.

The object of the present invention is achieved by joining a trunk pipe and a branch pipe to each other by arc welding, mechanically cutting or laser cutting the end surfaces to which flanges are to be joined of the trunk and branch pipes, and joining by laser welding already mechanically processed flanges to the end surfaces of the processed trunk and branch pipes.

According to the present invention, a trunk pipe and a branch pipe are thermally deformed when they are joined together by arc welding. However, after the deformed portions are mechanically processed to increase the accuracy of the pipes to a proper level, flanges can be joined to the end portions of the same pipes by laser beam welding which causes minimum thermal deformation. Therefore, it is unnecessary to carry out a machining process after the pipes and flanges are finally welded, and a highly accurate tubular container can be obtained in less time. Especially, in the case of production of a sheath for a device formed by combining a plurality of machines, such as a gas insulating switch device, these advantages are more markedly displayed.

A further object of the present invention is to provide the techniques for butt-welding two members, capable of obtaining a perfect penetration bead in one pass.

The object of the present invention can be achieved by a welding method, wherein two parallel surfaces of two members are brought into abutment and welded to each other, wherein a surface to be welded, which projects relatively from a surrounding surface, of one member and a surface to be welded of another member are abutted on each other, with heat being then applied from a position on a plane including the surfaces to be welded to the same surfaces in the direction substantially parallel to the surfaces to be welded, whereby the surfaces are welded to each other.

Other object of the present invention can be achieved by a pipe welding apparatus comprising a fixed base, a rotating means provided on the fixed base, a rotary body adapted to be rotated by the rotating means, and a driving means provided on the rotary body and adapted to support a tubular material to be welded at its both end opened portions and drive the material, the axis of rotation of the rotary body and that of the tubular material driven by the driving means crossing each other perpendicularly, the axis of rotation of the rotary body and that of the tubular material being aligned with each other when the rotary body is rotated.

When two members are brought into abutment and welded to each other, the portion of one member which is adjacent to the surface thereof to be welded is tapered in advance.

Due to this tapered part, the welding heat can be applied from a position on a plane including the surfaces to be welded to these surfaces in the direction parallel to the same surfaces.

The surfaces to be welded are disposed on one plane, and do not on not less than two planes.

Therefore, the depth of penetration becomes uniform in the portions of two members which are in the vicinity of the surfaces to be welded.

When the members to be welded have not less than two surfaces to be welded the perpendiculars of which cross each on the at right angles as in a case where flanges are welded to each of two perpendicularly crossing unitarily combined pipes, one surface to be welded is welded first as the relative member is rotated around a line perpendicular to the same surface, i.e. the axis thereof. Another surface to be welded is then welded as the relative member is rotated around a line perpendicular to the same surface, i.e. the axis thereof.

If the welding is thus carried out in order, members having not less than two surfaces to be welded which have a predetermined angle therebetween can be welded with a high efficiency.

A further object of the present invention is to provide a laser machining system which is suited especially for cutting the end of a tubular container and for welding the tubular container and a flange not by moving the workpiece in accordance with the machining application but by using a laser beam for a series of continuous machining operations by devising the machining heads.

Yet anther object of the present invention is to provide a laser machining system for achieving the above-specified object by correcting the gap between the pipe end and the flange groove and the dislocation and a machining apparatus for performing the cutting and welding operations easily in accordance with the machining application of the workpiece and a positioning device capable of correcting either the gap between the pipe end and the flange groove or the dislocation easily even when the flange is to be welded to the end of a tubular container.

According to the present invention, a laser machining system comprises conveyor means for conveying a workpiece to be machined, a laser oscillator for oscillating a laser beam for machining said workpiece on the conveyor means, a beam guide for guiding the laser beam emitted from the laser oscillator and including a bend mirror for changing the path of the laser beam, and a plurality of machining heads adapted to be interchanged in accordance with the machining application of the workpiece for irradiating an identical position on the woekpiece with the laser beam which has its path changed in an identical position and is guided by said beam guide.

A laser machining system of the present invention arranges the plurality of machining heads concentrically with respect to a pivot axis of a disc, with the plurality of machining heads being disposed about the circumference of the disc and being selectable in accordance with the machining application of the workpiece by turning said disc.

A laser machining system of the present invention may comprise conveyor means for conveying a tubular container having its end portion assembled with a flange, a laser oscillator for oscillating a laser beam to cut said tubular container on said conveyor means or weld the same to said flange, and a beam guide for guiding the laser beam outputted from said laser oscillator. The cutting and welding heads may be adapted to be moved in accordance with the cutting operation of the tubular container or the welding operation to said flange for irradiating the laser beam, which is guided by said beam guide, to execute the cutting operation of the tubular container or the welding operation to the flange.

According to the present invention, a machining apparatus is provided which includes a rotary disc, a plurality of machining heads arranged concentrically at a predetermined spacing on a circumference of a rotary disc for irradiating a workpiece to be machined with a laser beam coming from a laser oscillator through an optical system to machine the workpiece, with drive means rotatably driving the rotary disc with said machining heads, wherein the optical axis of the laser beam coming from the laser oscillator and the optical axis of the optical system of the machining heads on the rotary disc are aligned with each other.

According to the present invention, a positioning device comprises a width adjusting mechanism for correcting the axial gap of the abutting portions of tubular members to be welded, with a pipe expanding mechanism being provided for correcting the radial dislocation of the abutting portions of the tubular members, and with a turn mechanism for turning the tubular members while being expanded by the pipe expanding mechanism.

A machining head x according to the present invention, may comprise a generally cylindrical nozzle for guiding a laser beam from a laser oscillator in the vicinity of a workpiece to be machined; a condensing lens disposed midway in the nozzle for condensing the laser beam to irradiate the workpiece with the condensed laser beam; and shield gas introducing means for introducing a shield gas which is used to shield the laser beam in the nozzle against a wall surface and which is to be sprayed toward the workpiece while guiding the laser beam, wherein the nozzle has a variable aperture at tip thereof and The laser machining system of the present invention may also comprise first conveyor means for conveying a trunk pipe having a branch pipe fixed in advance to its predetermined portion; a cutting station for cutting the branched trunk pipe conveyed by the conveyor means; a flange assembling station for assembling each of those ends of the branched trunk pipe conveyed by said first conveyor means, which were cut at the cutting station, with the flange which is conveyed by the second conveyor means being arranged generally at a right angle with respect to said first conveyor means; and a welding station for welding each of those ends of the branched trunk pipe conveyed by the first conveyor means, which were assembled with a flange at the flange assembling station, and the flange-assembled portion of the same with a laser beam.

In the laser machining system of the present invention, when the workpiece being conveyed on the conveyor means comes to a predetermined position, it is irradiated with the laser beam so that it may be subjected to a predetermining machining such as the welding or cutting. Then, the workpiece can be continuously welded or cut in an identical position merely by interchanging, selecting or rotationally moving the plural machining heads in accordance with the machining application of the workpiece itself. Moreover, the branched trunk pipe is cut at its end by means of the laser beam, before the flange is attached thereto, and its portion to be assembled with the flange is welded by the laser beam. As a result, no machining is required after the welding operation so that the machining operations can be continuously accomplished.

In the machining apparatus of the present invention, the plural machining heads are arranged along the circumference of a rotary disc, with the machining heads being concentric to the pivot of the rotary disc, with a fixed rotational drive system. As a result, the optical axis of the laser beam and the optical axis of the optical system of the machining head can be aligned to prevent the laser beam from coming out of focus.

In the positioning device of the present invention, furthermore, the axial gap of the abutting portions of the tubular members to be welded is corrected by the width adjusting mechanism, and the radial dislocation of the abutting portions of the tubular members is corrected by the pipe expanding means. At the same time, the tubular members expanded by the aforementioned pipe expanding means can be rotated by the rotating mechanism. As a result, the axial gap and the dislocation of the abutting portions can be reliably corrected to ensure the laser beam welding.

DETAILED DESCRIPTION OF THE PREFERRED EMBODIMENTS

Figure 1:
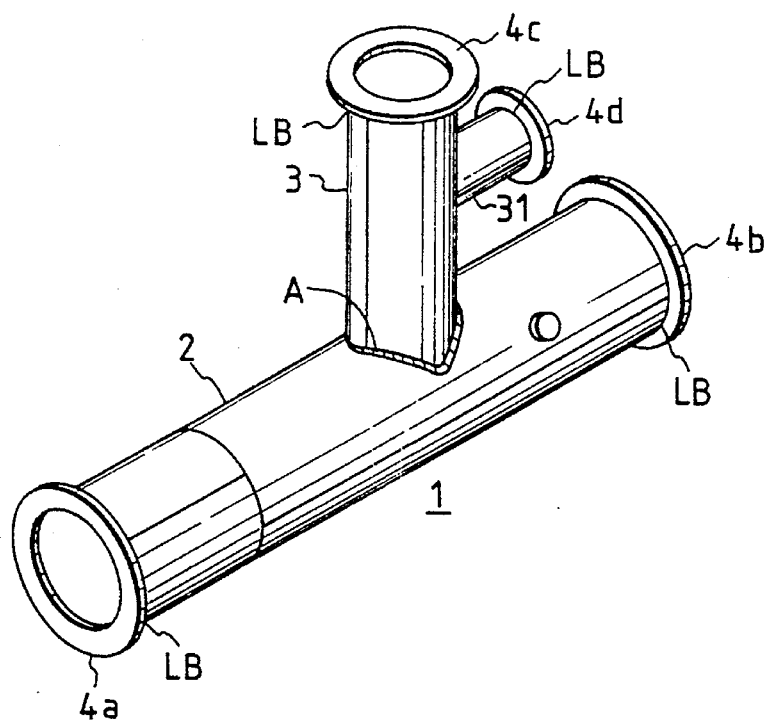
FIG. 1 is a perspective view of one embodiment of a welded metal container constructed in accordance with the present invention.

As shown in FIG. 1 sheath 1 used for a gas insulated switch gear is composed of a trunk or main pipe 2, branch pipes 3 and 31 joined generally at a right angle with respect to the axial direction of the trunk pipe 2, by an arc welding A, flanges 4a and 4b joined to the two ends of the trunk pipe 2, flanges 4c and 4d joined to the ends of the branch pipes 3 and 31. The sheath 1 is constructed by bonding the trunk pipe 2 to the flanges 4a and 4b and bonding the branch pipes 3 and 31 to the flanges 4c and 4d by the laser beam welding LB.

In the embodiment of FIG. 1, the thermal deformations by the arc welding A are solved by carrying out the laser beam welding after the arc welding A. After the arc welding A, end portions of the trunk pipe 2 and branch pipes 3 and 31 are machined presicely and flanges 4a, 4b, 4c and 4d are welded to the end portions of the trunk pipe 2 and branch pipes 3 and 31 by the laser beam welding LB. As a result, the sheath 1 obtained can be highly accurate and the workability and the assembly accuracy can be improved in assembling the sheath 1.

For example, when the following conditions of the welding, diameter of the trunk pipe: 600 mm, length of the trunk pipe: 2,000 mm, thickness of the trunk pipe: 4.5 mm–12 mm, weld width (bead width): 2 mm–3 mm, Laser output: 5 Kw–10 Kw the flange welded by the laser beam is inclined or falls down by around 0.3 mm. Therefore, accurateness in the degree of parallelization and perpendicularity is sustained.

Figure 2:
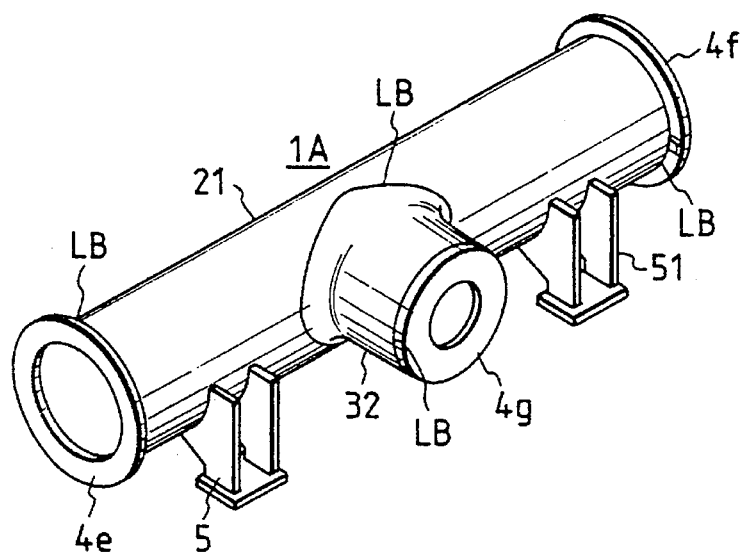
FIG. 2 is a perspective view of another embodiment of a welded metal container constructed in accordance with the present invention.
Figure 3:
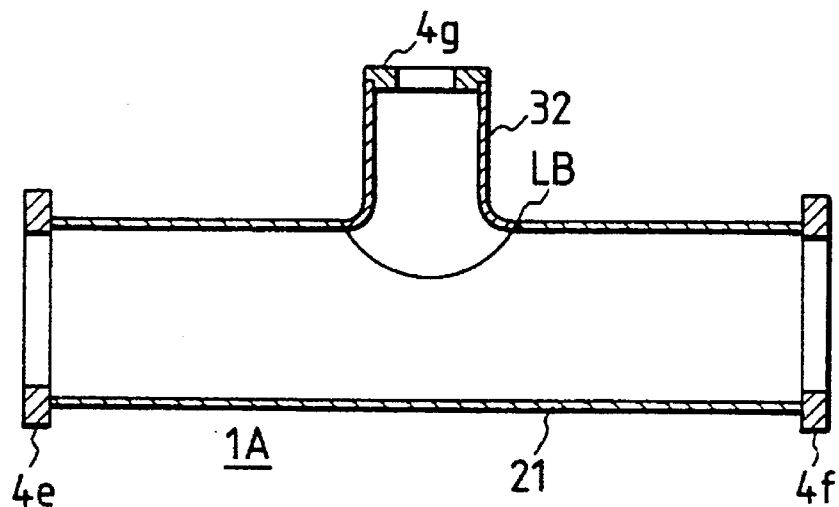
FIG. 3 is a longitudinal sectional view of the welded metal container of FIG. 2.

In FIGS. 2 and 3 showing a second embodiment, a sheath 1A comprises a trunk pipe or trunk pipe 21, a branch pipe 32 joined to the trunk pipe 21, the flanges 4e, 4f and 4g joined individually to the two ends of the trunk pipe and the end of the branch pipe 3 and or supports 5 and 51.

In the embodiment of FIGS. 2 and 3, the laser beam welding LB is applied to the joints between the trunk pipe 21 and the flanges 4e and 4f, between the branch pipe 32 and flange 4g, between trunk pipe 21 and the stays 5 and 51, and between the trunk pipe 21 and the branch pipe 32. Particularly, in the embodiment of FIGS. 2 and 3 the arc welding A is carried out in advance, and thereafter a highly accurate welding is performed by the laser beam welding. Therefore, a highly accurate tubular container can be easily provided.

The laser beam welding is not suitable in applying to an corner portion. In the embodiment of FIGS. 2 and 3, the end portion of the branch pipe 32 is flared in advance, and the branch pipe 32 is bonded to the trunk pipe 21 by the laser beam welding LB. As a result, it is easy to apply an automatic welding system with a low strain and to produce a high accurate sheath.

Figure 4:
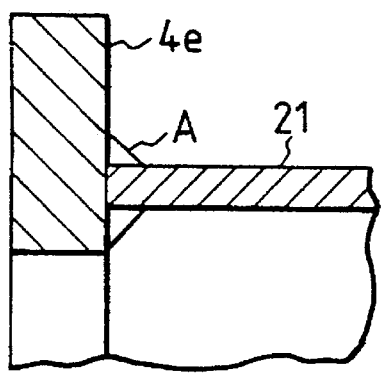
FIG. 4 is a sectional view of a joined portion of the trunk pipe end and the flange.
Figure 5:
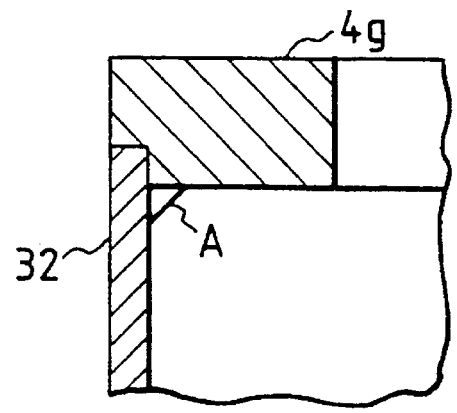
FIG. 5 is a sectional view of a joined portion of the branch pipe end and the flange.

Incidentally, the sections of the joints between the flange 4e and the trunk pipe 21 and between the flange 4g and the branch pipe 32 are shown in detail in FIGS. 4 and 5, respectively. As shown, not only the end of the trunk pipe and the flanges 4e, and the end of the branch pipe 32 and the flanges 4g are welded by the laser beam, but also the corners are fillet-welded from the inside and outside by the laser beam welding LB. Thus, the misalignment of the flanges 4e and 4g is reduced in comparison with those of the arc welding and the cost required in pre-straining, shaping, and machining works after the welding operations is reduced.

Figure 6:
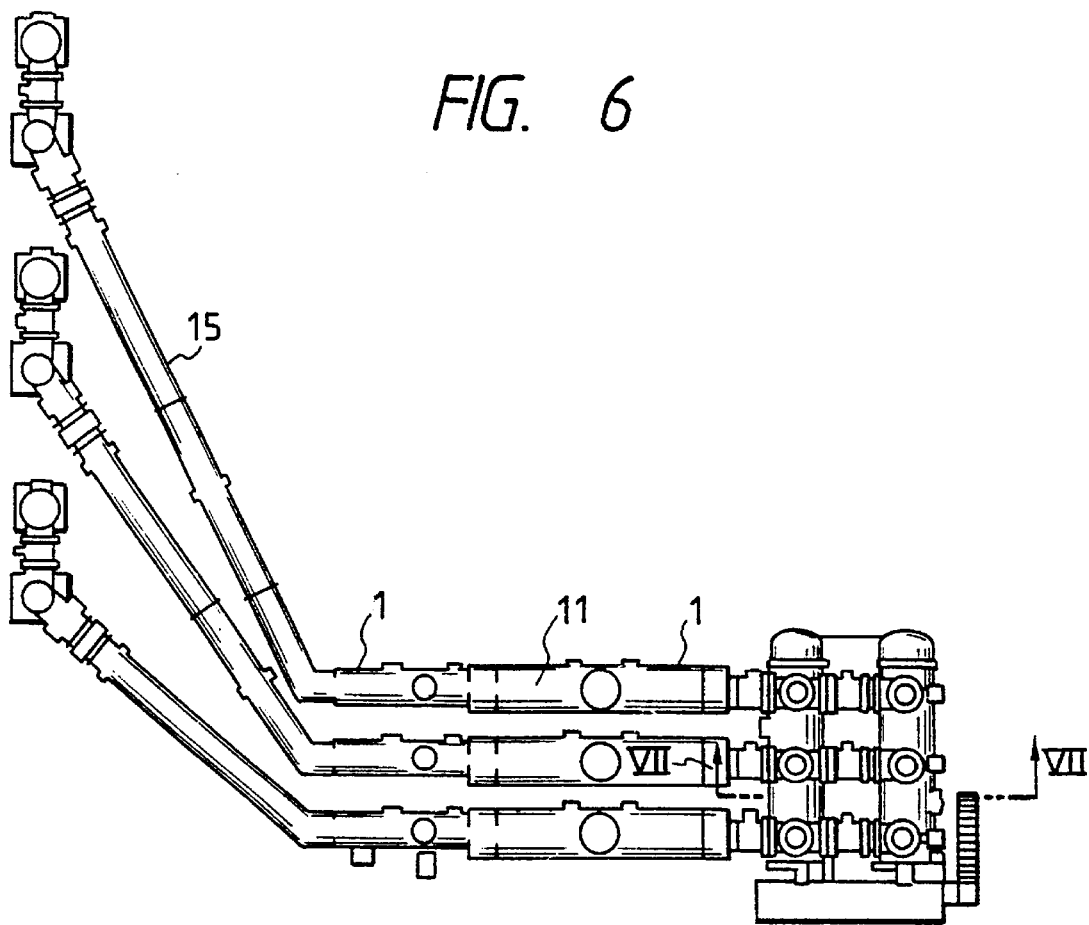
FIG. 6 is a schematic top plan view of a gas insulated switch gear according to the present invention.
Figure 7:
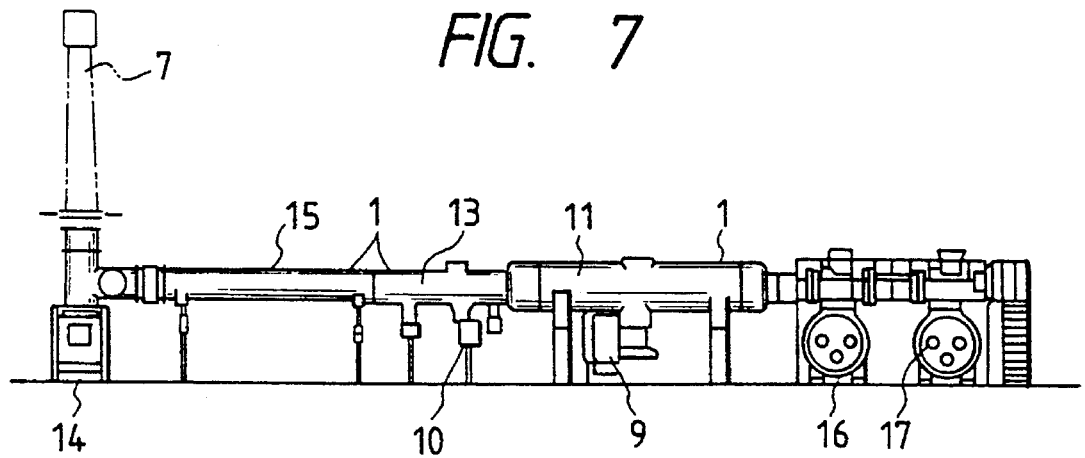
FIG. 7 is a front elevational view taken along the line VII—VII in FIG. 6.

FIG. 6 and 7 show an example, in which the present invention is applied to a gas insulated switch gear (GIS). The GIS is constructed of a breaker 11, a disconnector 13, an arrester 14 and a single phase bus 15. In these units, a trunk circuit conductor 17 of three phase bus 16 is supported by an insulator in the sheath 1 having the welded structure shown in FIG. 1 and has a structure in which a space is sealed with highly insulating SF gases. The individual units are connected through the flange 4a to 4g of the individual sheath 1 by bolts. Usually, the containers are sealed with the SF gases under 4 to 5 atms. This confinement may be performed at the time of installation. The flanges 4a to 4g of the sheath 1 are required to have both a flatness for ensuring the contactness thereof and effecting the sealing properties of an O-ring and the rectangularities with respect to the flanges 4c, 4d and 4g of the branch pipes 3, 31 and 32 which extend at a right angle from the other sheath 1 positioned below the trunk pipe 2 and 21 on the axis of the breaker 11 and covering the conductor 17 of the trunk bus and with respect to the flange 4a, 4b, 4e and 4f of the last-mentioned trunk pipe 2 and 21 of the other sheath 1.

In the present embodiment, the sheath for accommodating each device adopts the structure, in which the trunk pipe and the flanges, and the branch pipe and the flanges are welded by the laser beam welding. As a result, the aforementioned accuracy can be easily achieved to improve the efficiency of the assembly.

Figure 8:
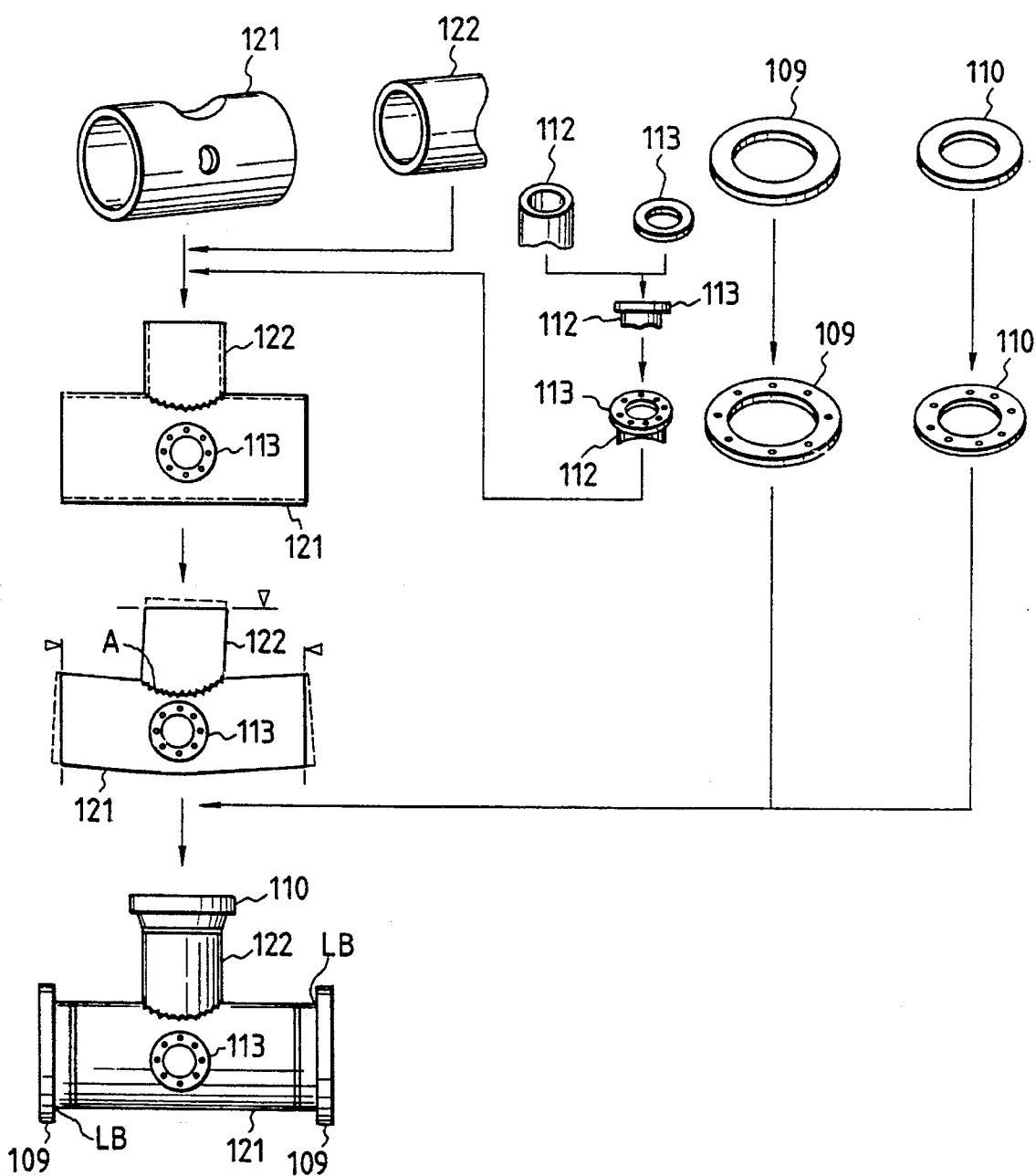
FIG. 8 is a flow chart showing the production of the pressure container for a gas insulated switch gear, which constitutes an embodiment of the method of producing a tubular container according to the present invention.

FIG. 8 shows a flow chart of the production process of the sheath 1 and 1A (container) for a GIS as shown in FIGS. 1 and 2. A sheath for a GIS is divided into four members, i.e. a trunk pipe 121, a branch pipe 122, trunk pipe flanges 109 and a branch pipe flange 110. Each member is prepared independently, and a bore for connecting the branch pipe 122 is made in the trunk pipe 121 in a subsequent step. The branch pipe is cut so that the shape of a joint end portion thereof corresponds to that of the bore made in the trunk pipe 121. Connecting bores are made in trunk pipe flanges 109 and a branch pipe flange 110, these flanges being then subjected to surface finishing and a process corresponding to the use of the sheath. The trunk pipe 121 and branch pipe 122 are then joined together by arc welding, and the end portion of the arc welded trunk pipe 121 and the branch pipe 122 are cut by the laser beam or machined in a subsequent step as shown in FIG. 8. The bored and surface finished trunk pipe flanges 109 and the branch pipe flange 110 are then joined by laser welding to the laser cut or machined end portions of the trunk pipe 121 and branch pipe 122 to produce a tubular sheath.

Figure 9A:
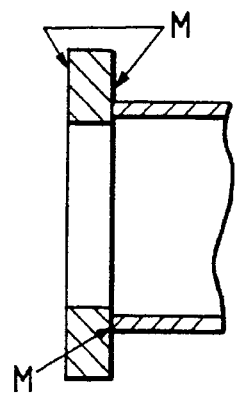
FIGS. 9a–9c are sectional views of various shapes of welded joints used for a tubular container constructed in accordance with the present invention.
Figure 9B:
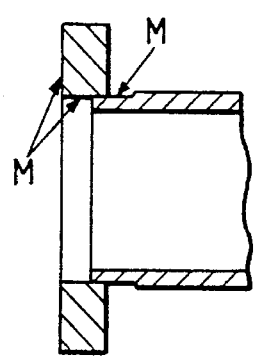
Figure 9C:
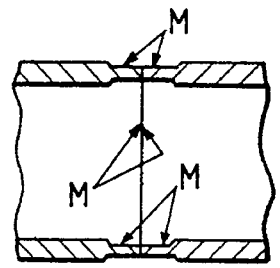

As welded structural members, as shown in FIG. 9a, 9b and 9c, a T-shape joint in which a pipe end is welded to an end surface of a flange, and a butt joint in which pipe ends are abutted on and welded to each other. Since the bevel portions of these joints are mechanically processed as shown in the drawings, the accuracy of the joints is improved, and the laser welding can be applied. This can prevent the welding deformation of the joints. Accordingly, even when a flange including a surface thereof to be sealed is mechanically processed in advance, and then welded by laser beam, the function of a sealed sheath can be sustained.

When the direction and size of the flange surface do not require a high accuracy with respect to a trunk pipe 101, as in a branch pipe for constituting a manhole, the branch pipe 12 and flange member 13 for forming the manhole are joined together in advance by arc welding, and the manhole-forming flange 113 is then mechanically processed. The resultant flange 113 is arc welded to the trunk pipe 1, and a product thus obtained is then subjected to the same steps as shown in FIG. 8.

Figure 10:
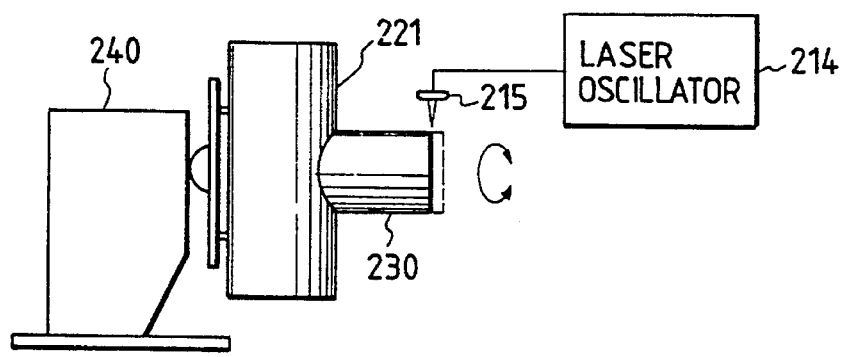
FIGS. 10 and 11 are schematic views of methods of cutting a pipe and surface in a tubular form in accordance with the present invention.

FIG. 10 shows an example of a means for cutting an end surface of the pipe shown in FIG. 8, in which the end portion of a branch pipe-carrying trunk pipe 221 is cut by applying the laser beam from a laser oscillator 214 to the end surface via a processing head 215 while tuning the branch pipe-carrying trunk pipe 230. The workpiece is positioned by a positioner 240.

Figure 11:
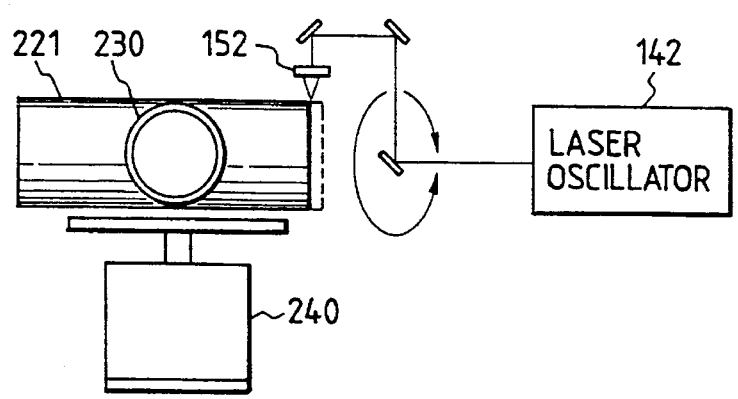

FIG. 11 shows an example of a means for cutting an end surface of the pipe shown in FIG. 8, in which the end portion of a branch pipe-carrying trunk pipe 230 is cut by applying the laser beam to the end surface while turning a laser processing head 152. The advantage of the laser cutting resides in that a highly accurate cut surface can be obtained by making a full turn of an object pipe or processing head irrespective of the cutting length of a pipe end surface.

According to this embodiment described above, a flange can be mechanically processed in the form of a single part. Therefore, a flange can be processed singularly in an intensive manner, and a comparatively small-sized processing machine can be used. This enables the set up time which is not included in the cutting time to be saved.

Since the pipe member plate working and welding step and flange machining step can be carried out simultaneously, the sheath producing period can be reduced by about 40%. In addition, the time required for a pipe shaping operation carried out after a branch pipe is welded to a trunk pipe can also be reduced by about 50–70% since the bending of the trunk pipe and the inclination of the branch pipe can be eliminated by the mechanical processing or laser cutting of the pipe end surface.

Figure 12A:
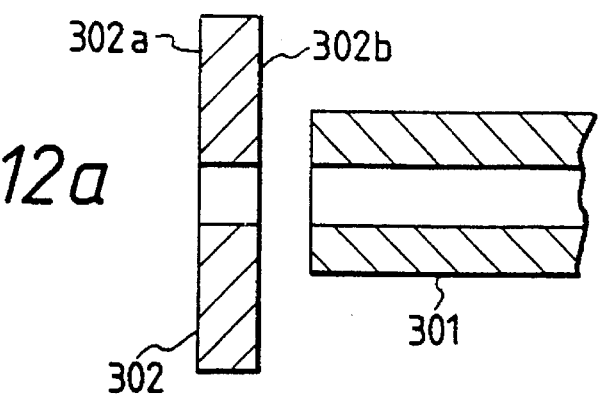
FIGS. 12a–12c are sectional views illustrating the steps of welding the pipe and a flange to each other by a welding method of the present invention.
Figure 12B:
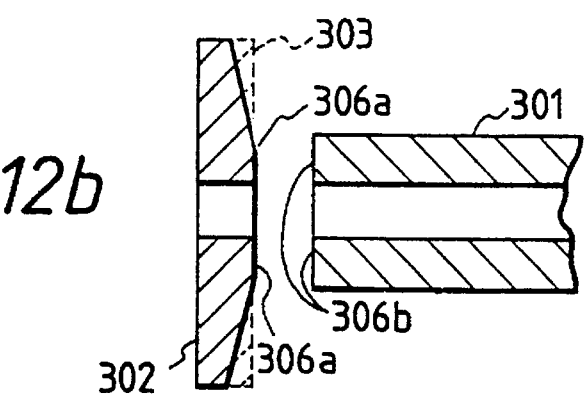
Figure 12C:
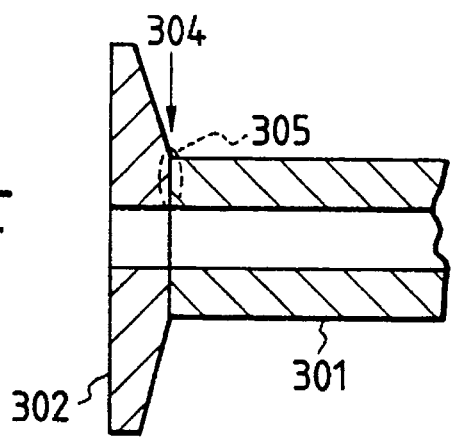
Figure 13:
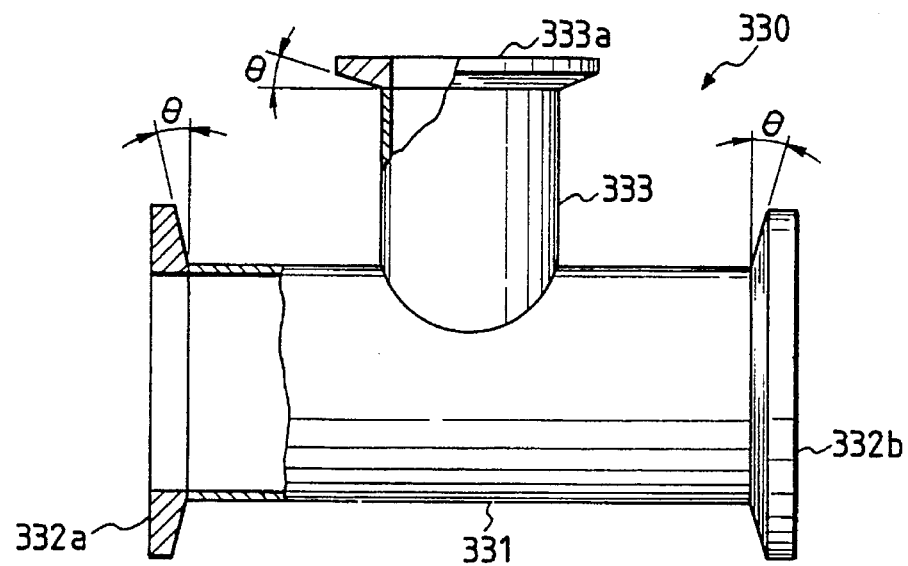
FIG. 13 is a partial sectional view illustrating an applied example of a welding method of the present invention.

FIGS. 12a, 12b, and 12c are sectional views showing the steps of welding a pipe 301 and a flange 302 to each other by a welding method. FIG. 13 is a sectional view illustrating an example to which the welding method of this embodiment is applied.

FIG. 12a shows the condition of the pipe 301 and flange 302 not yet subjected to a welding process. The two surfaces 302a and 302b of the flange are parallel as shown in the drawing.

FIG. 12b shows the flange 302 tapered by cutting off the portion thereof shown by broken lines 303. If the flange 302 is processed in this manner, the surface thereof, opposed to a surface 306b of the pipe 301 to be, becomes parallel at a portion 306a to be welded thereof to the surface 306b. The angle of inclination of this tapering surface is about 9°.

FIG. 12C shows the tapered flange 302 and pipe 301 abutted on and laser welded to each other. Since the flange 302 is tapered, a laser beam can be applied in the direction of an arrow 304 to the surfaces 306a and 306b to be welded. As a result, the depth of penetration 305 shown by a broken line of the welded surfaces 306a and 306b become substantially uniform. If the flange and pipe are machined at their surfaces to be welded to a predetermined surface accuracy and then subjected to welding, there can be complete penetration with one pass.

Even when the outer diameter of the pipe has tolerance, the surfaces 306a, 306b to be welded of the flange 302 and pipe 301 have no clearance therebetween. Therefore, a stable laser welding operation can be carried out.

FIG. 13 is a sectional view of a principal portion of a branch pipe-carrying pressure container 330, an example to which the above embodiment is applied.

This pressure container 330 is a pressure container for a GIS used for a gas insulating transformation machine which is used with an insulating gas, such as SF gas sealed therein.

The pressure container 330 includes two perpendicularly crossing pipes 331, 333, and flanges 332a, 332b, 333a welded to the end surfaces of these pipes 331, 333.

If the welding method of the embodiment described in FIGS. 12a to 12c is used for welding the flanges 332a, 332b and 333a to the pipes, they can be laser welded reliably and the leakage of the insulating gas can be prevented.

Figure 14:
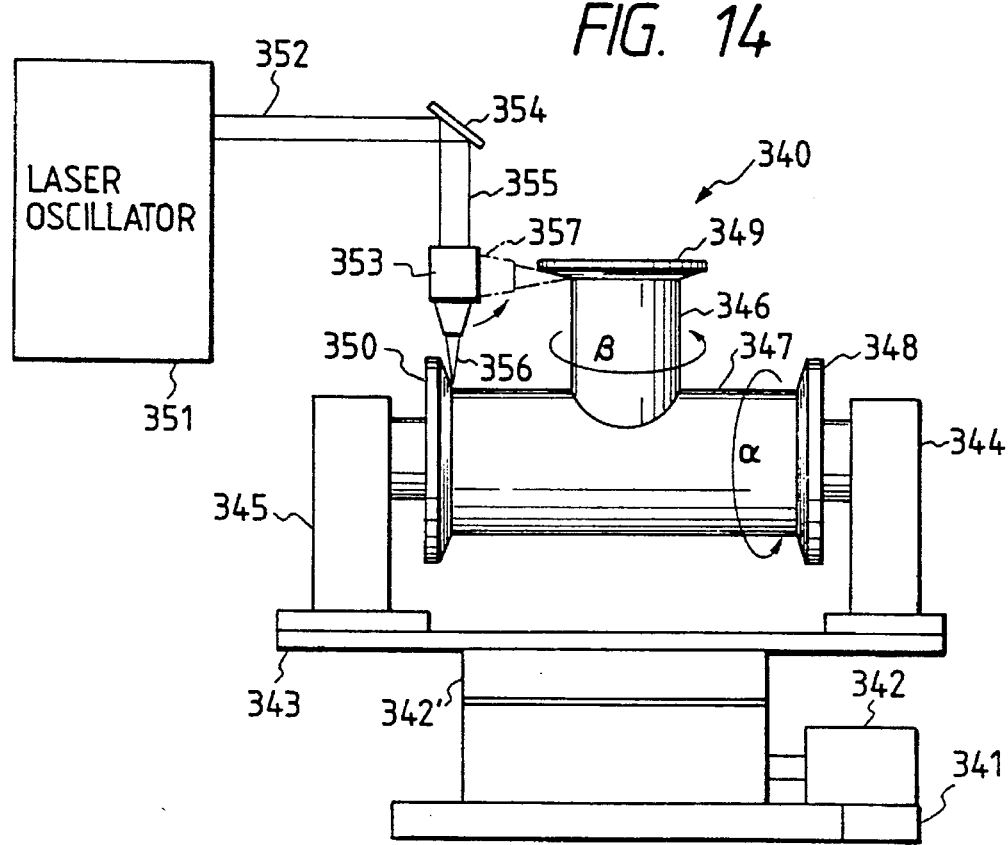
FIGS. 14 and 15 are schematic views of a welding apparatus of other embodiments of the present invention.

The welding apparatus 340 of FIG. 14 is provided with a fixed base 341, a rotary unit 342 and 342' set on the fixed base 341, a rotary disc 343 adapted to be rotated by the rotary unit 342, and two opposed rotary units 344, 345 set on the rotary disc 343, and the axis of rotation of the rotary disc and that of rotation of a member rotated by the two rotary units 344, 345 cross each other perpendicularly.

A material to be welded is set as a member rotated by the two rotary units 344, 345, and three flanges 348, 349, 350 are laser welded to the end surfaces of two perpendicularly crossing pipes 346, 347 as shown in the drawing.

The apparatus for laser welding these parts includes a laser oscillator 351, a bending mirror 354 adapted to change the path of a laser beam 352 emitted from the laser oscillator 351, and a processing head 353 adapted to apply a laser beam 355, the path of which has been changed, to the surfaces to be welded.

An operation of welding the pipes 346, 347 and flanges 348, 349, 350 to each other by using this apparatus will now be described.

The path of the laser beam 352 outputted from the laser oscillator 351 is changed by the bending mirror 354, and the resultant laser beam is introduced into the pivotable processing head 353. A condensed laser beam 356 is applied in the perpendicularly downward direction to a groove between the tapering flange 350 and pipe 347 to weld the same.

In this case, the pipe 347 is rotated in the direction a by the rotational movements of the rotary units 344, 345, whereby the full-circled welding of the flange 350 and pipe 347 can be carried out.

The welding of the flange 343 and pipe 347 is carried out by turning the rotary disc 348 in a 180-degree arc, and then applying a laser beam 356 to the flange 348 and pipe 347.

If one more laser oscillator is provided, the flange 348, 350 can be welded at once to the pipe 347.

In order to weld the flange 349 to the pipe 346, the processing head 353 is turned up in a 90-degree arc to be set in a horizontal position shown by a two-dot chain line, and a laser beam is then applied to the surfaces to be welded.

When the rotary disc 343 is rotated by using the rotary unit 342, 342' in this case, the pipe 346 is rotated in the direction β to enable the full-circled welding of the pipe 346 and flange 349 to be carried out.

When the welding apparatus 340 of the second embodiment is used, the laser welding of a flange and a pipe of a branch pipe-carrying tubular pressure container can be easily carried out.

Figure 15:
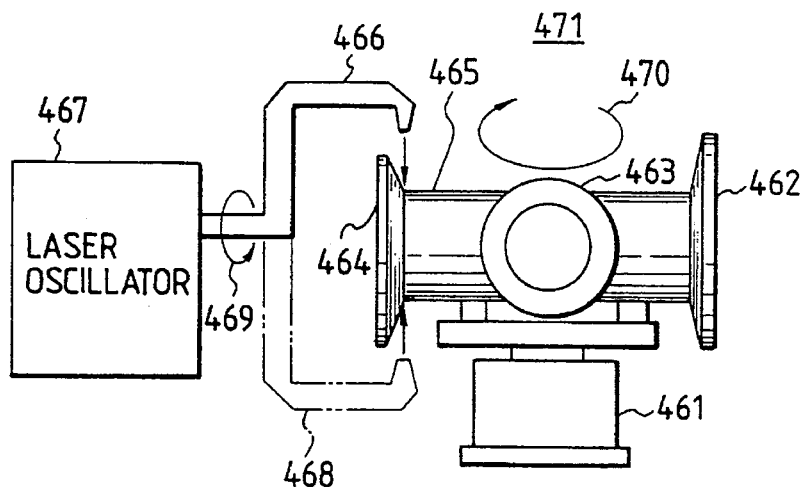

FIG. 15 illustrates other welding method which is used to laser weld a flange and a pipe of a branch pipe-carrying tubular pressure container.

The shape of this branch pipe-carrying tubular pressure container 471 is substantially identical with that of the branch pipe-carrying tubular pressure container shown in FIG. 13, and the container 471 has two pipes, i.e. a pipe 465, and a pipe (extending at right angles to the surface of FIG. 15) crossing the pipe 465 perpendicularly, the respective end portions of these pipes being adapted to be subjected to laser welding for joining flanges 462, 463, 464 thereto.

An apparatus for laser welding these flanges to the pipes is provided with an oscillator 467, and a rotary processing head 66 adapted to apply a laser beam emitted from the the oscillator 467 to the surfaces to be welded, and this rotary processing head is adapted to be rotated in the direction of an arrow 469.

A rotary unit 461 is adapted to rotate the branch pipe-carrying tubular container 471 freely and substantially horizontally.

The operation of each apparatus in the laser welding of workpieces will now be described.

The laser beam outputted from the laser oscillator 467 passes through the rotary processing head 466 to be applied to the branch pipe-carrying tubular pressure container 471 fixed on the rotary unit 461, and carry out the full-circled welding of the pipe 465 and flange 464.

After the completion of the welding of the pipe 465 and flange 464 to each other, the rotary unit 461 is turned 90° in the direction of an arrow 470, and the welding of the flange 463 is carried out. The rotary unit 461 is then further turned 90° to carry out the welding of the flange 462.

According to the welding method of this embodiment, the laser welding of flanges and pipes of a branch pipe-carrying tubular pressure container can be easily carried out with a laser butt welding of pipe and flange of not less than 500 mm in diameter. Accordingly, the cost of production of a branch pipe-carrying tubular pressure container can be greatly reduced.

Figure 16:
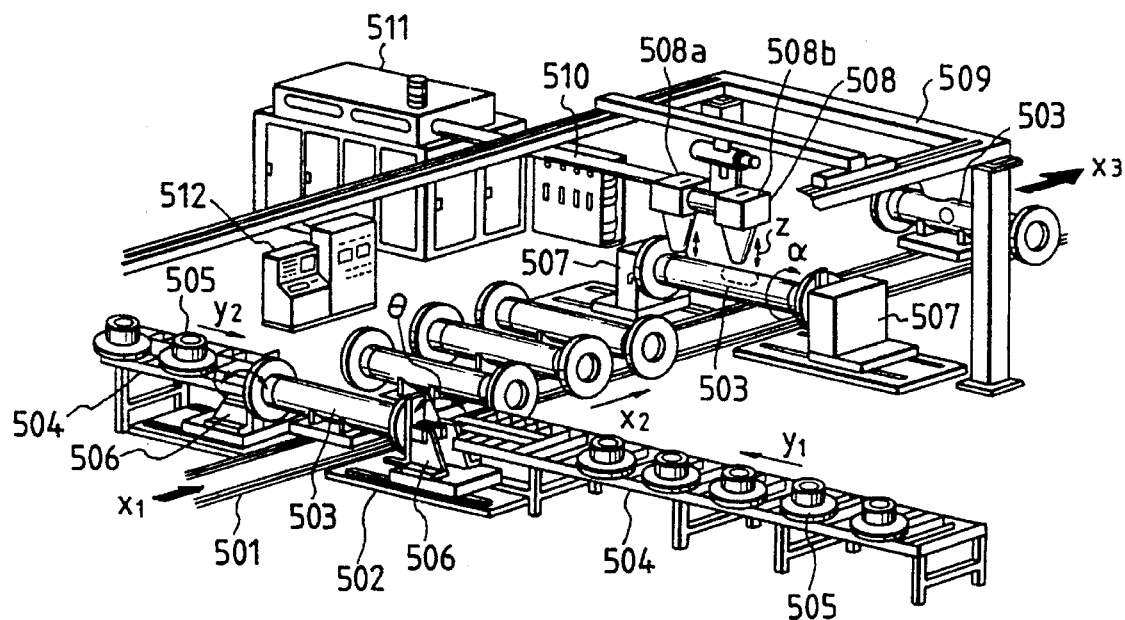
FIG. 16 is a perspective view showing one embodiment of a laser machining system constructed in accordance with the present invention.

FIG. 16 shows the structure of a system which exemplified one embodiment of the laser machining system. In this system, the welding of a trunk pipe and a flange along the bus of a gas insulating control apparatus and the boring of the trunk pipe are accomplished by a laser beam.

A conveyor truck 502 on conveyor rails 501 runs to form a first conveyor line. The aforementioned conveyor truck 502 carries a workpiece or trunk pipe 503 to convey it midway of the first conveyor line in the direction of arrow $X_1$. Conveyors 504 are arranged at the two sides of the first conveyor line generally at a right angle with respect to said first conveyor line to convey flanges 505 to be welded to the two ends of the trunk pipe 503 in the directions of arrows $Y_1$ and $Y_2$, thus forming a second conveyor line. A number of flange assembling apparatus 506 are arranged at the two sides of the conveyor rail 501 so that it may assemble the flanges 505 conveyed on the conveyors 504 to the two ends of the aforementioned trunk pipe 503 by changing the directions of the flanges 505. The trunk pipe 503 thus assembled with the flanges 505 by that flange assembling means 506 is conveyed by the conveyor truck 502 on the conveyor rails 501 in the direction of arrow $x_2$ to a subsequent step. A positioning device 507 is arranged midway of the conveyor rails 501 to rotatably support the trunk pipe 503 conveyed in the direction $x_2$ and assembled with the flanges 505 and to correct the axal gap and radial dislocation of the abutting portions of the flanges 505 and the trunk pipe 503. A rotary machining apparatus 508 is provided for welding the flanged trunk pipe 503 supported by the positioning device 507 to the flanges 505 and for boring the trunk pipe 503 by using the laser beam. The rotary machining apparatus 508 has its welding head 508a and boring head 508b arranged rotatably. This rotary machining apparatus 508 is supported by a suspender 509 so that it can be moved in the directions x and y. The welding head 508a and the cutting head 508b can be moved in the (vertical) direction z and are connected to a laser oscillator 511 through a beam guide 510 with a control unit 512 controlling the entire system.

Figure 17:
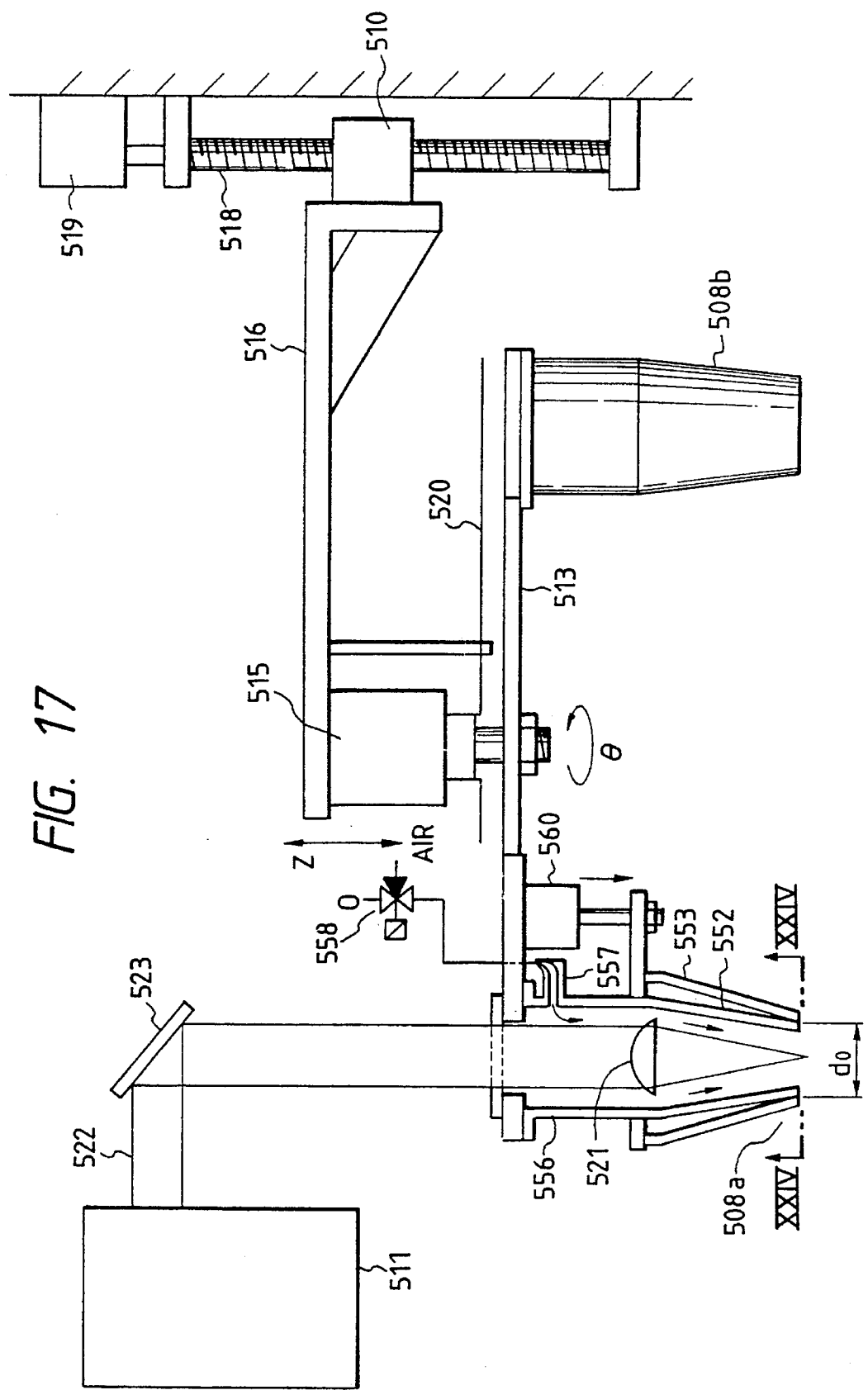
FIG. 17 is a front elevational schematic view of a machining apparatus used in the laser machining system of the present invention.
Figure 18:
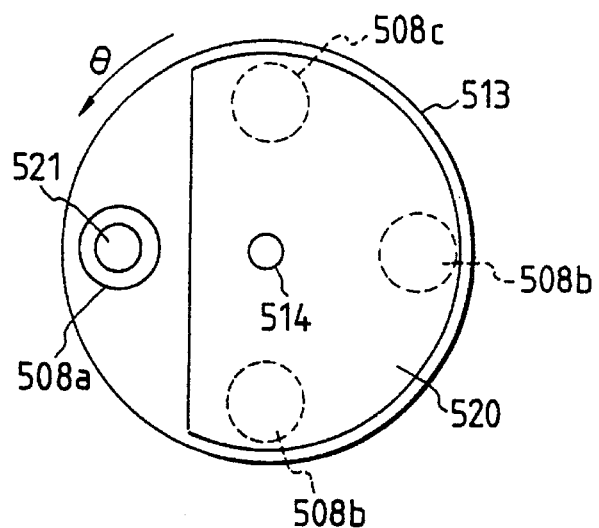
FIG. 18 is a top plan view of FIG. 17.

As shown in FIGS. 17 and 18, the rotary machining apparatus 508 includes a plurality of welding and cutting heads 8a to 8d which are arranged at a predetermined spacing on the ends of a rotary disc 513 and concentrically with a pivot 514. The rotary disc 513 is rotatably driven by a drive motor 515 fixed on a vertically moving base 516 provided at its one end with a nut engaging with a threaded shaft 518. Thus, the entire apparatus can be vertically moved (in the z direction) by driving a vertically moving motor 519 connected directly to the threaded shaft 518. A dust cover 520, attached to the vertically moving base 516 covers the optical system 521 of an unused machining head, as shown in FIG. 18 to protect the optical system 521 against any dust or another contaminants. The optical system 521 is mounted on the rotary disc 513 so as to have its optical axis aligned with that of a laser beam 522 guided by a beam guide when the laser beam 522 has its path changed downward by a bend mirror 523.

Next, the positioning device 507 will be described in detail with reference to FIGS. 19, 20 and 21.

Figure 21:
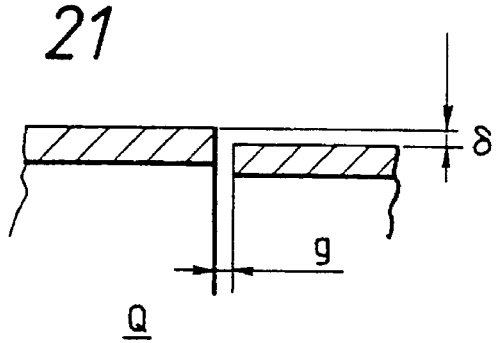
FIG. 21 is a detailed sectional view of a portion of the abutting portions of the trunk pipe and a flange.

FIG. 21 shows a seam portion at the time of the butt welding of the trunk pipe 503 and the flanges 505. Usually, there arise a widthwise gap g and an external dislocation δ when the trunk pipe 503 and the flanges 505 abut against each other. In case of the laser beam welding, the allowable values are set at g≦0.3 mm and δ=0.5 mm. The positioning device is used to effect the positioning within the above-specified values.

Figure 20:
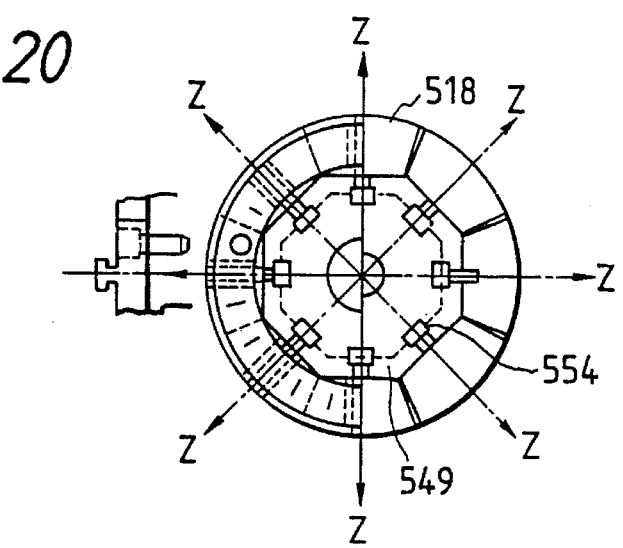
FIG. 20 is a side elevational view taken in a direction of the arrow T in FIG. 19.
Figure 19:
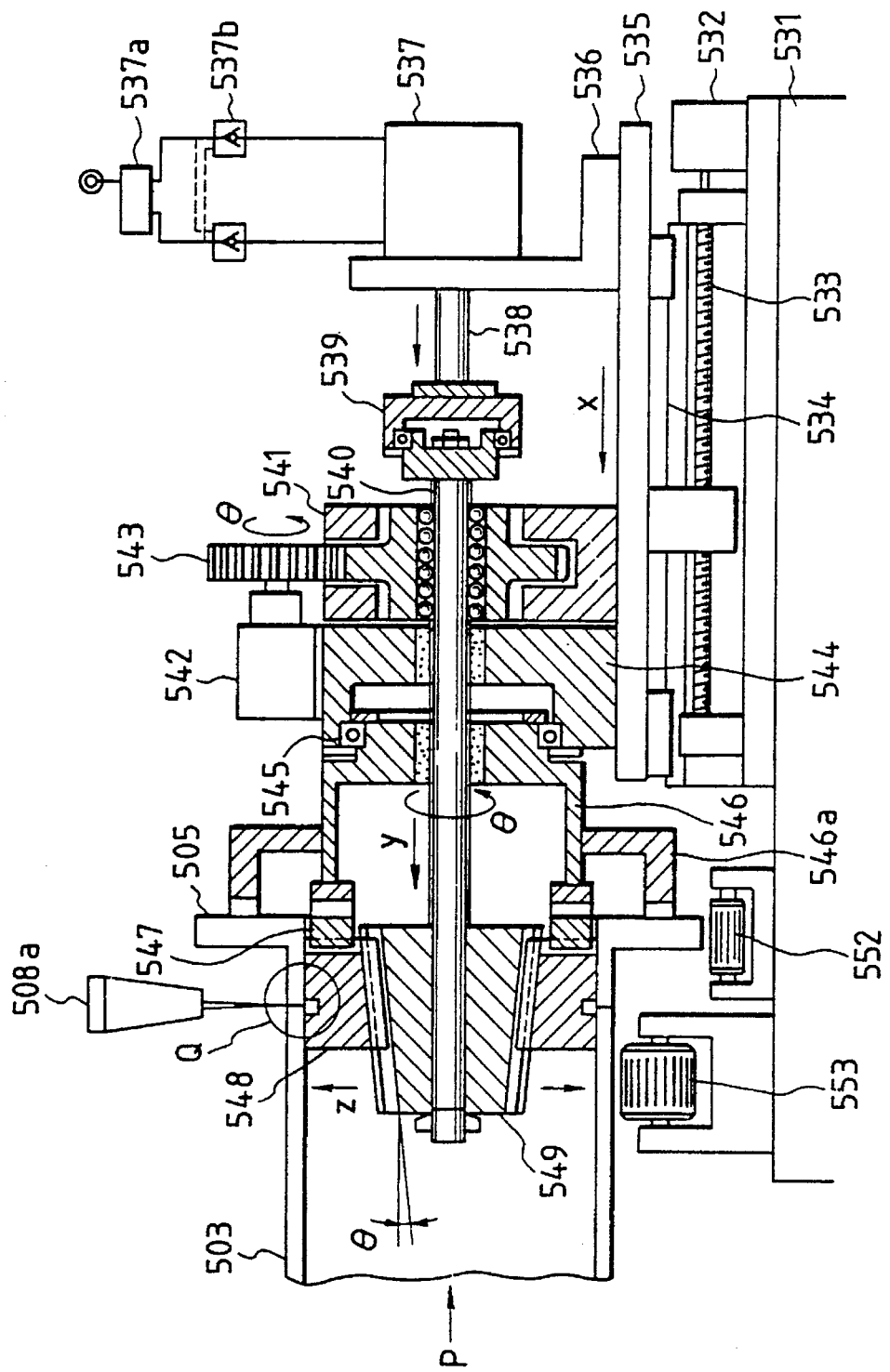
FIG. 19 is a sectional view of a positioning device used with the system of the present invention.

As shown in FIGS. 19 and 20, a width adjusting motor 532 is mounted on a stationary base 531, with an output shaft of the motor 532 being connected to a driving threaded shaft 533 overlaid by a moving base 535 which is supported on guide rails 534. On one end of the moving base 534, there is mounted a pipe expanding cylinder 537 which is supported by a bracket 536. To the pipe expanding cylinder 537, there is connected a hydraulic motor 537a through a hydraulic electromagnetic valve 537b. Moreover, this pipe expanding cylinder 537 has its cylinder rod 538 connected to a spline shaft 540 through a coupling 539, and these cylinder rod 538 and spline shaft 540 are arranged on a common axis.

A pipe rotating motor 542 has its output shaft fixed to a gear 543 meshing with a spline bearing 541 for transmitting the rotation and slide.

In front of the aforementioned moving base 535, on the other hand, there is fixed a support base 544 for supporting the pipe expanding spline shaft. A rotary guide 546 is connected to the support base 544 through a bearing 545. A pressure plate 546a for contacting with the end face of the flange 505 to be welded to the trunk pipe 503 and a slide guide 547 for supporting a pipe expanding core 548 an provided at one end of the rotary guide 546. A taper rod 549 which supports the pipe expanding core 548 on its sloped side through a slide guide 554 is provided at a leading end of the spline shaft 40.

A flange receiving roller 552 for receiving the flange 505 and a trunk pipe receiving roller 553 for receiving the trunk pipe 503 are fixed to the stationary base 531.

When the pipe expanding cylinder 537 is retracted by operating the hydraulic electromagnetic valve 537b, the taper rod 549 is retracted, and the pipe expanding core 548 is bulged or expanded. If the pipe expanding cylinder 537 is advanced, on the other hand, the pipe expanding core 548 is radially constricted from the center axis. If, the rotary motor 542 is rotated in a direction Θ, the spline shaft 540 is rotated through the gear 543 and the spline bearing 541. Simultaneously with this, the rotation is also transmitted to the taper rod 549. Since the cylinder rod 538 of the pipe expanding cylinder 537 and the spline shaft 540 are connected by the coupling 549 having a built-in bearing, the rotations are blocked here.

If, moreover, the width adjusting motor 532 on the stationary base 531 is rotated, the driving threaded shaft 533 is rotated, and the moving base 535 carried on the slide guide 534 is moved in the direction x of the trunk pipe 503 so that the flange contacting plate 546a adjusts the widthwise positions of the flange 505. At this time, the pipe expanding cylinder 537 in the constricted state is inserted from the ends of the trunk pipe 503 and the flange 505 supported by their individual receiving rollers 552 and 553. The pipe expanding cylinder 537 is advanced, and the expanded pipe is temporarily stopped at the instant when the cylinder 537 comes into contact with the inner wall of the trunk pipe. Then, the width adjusting motor 532 is rotated to move the moving base 535 forward to bring the trunk pipe 503 and the flange 505 close to each other. After this, the pipe expanding cylinder 537 is further advanced to effect the pipe expansion, which is stopped and held when the dislocation between the flange 505 and the trunk pipe comes into within the allowable range. Next, the driven motor 542 is rotated to rotate the trunk pipe 503 and the flange 505 together. After this, the welding is executed by radiating the laser beam from the welding head 508a positioned thereabove.

Figure 22:
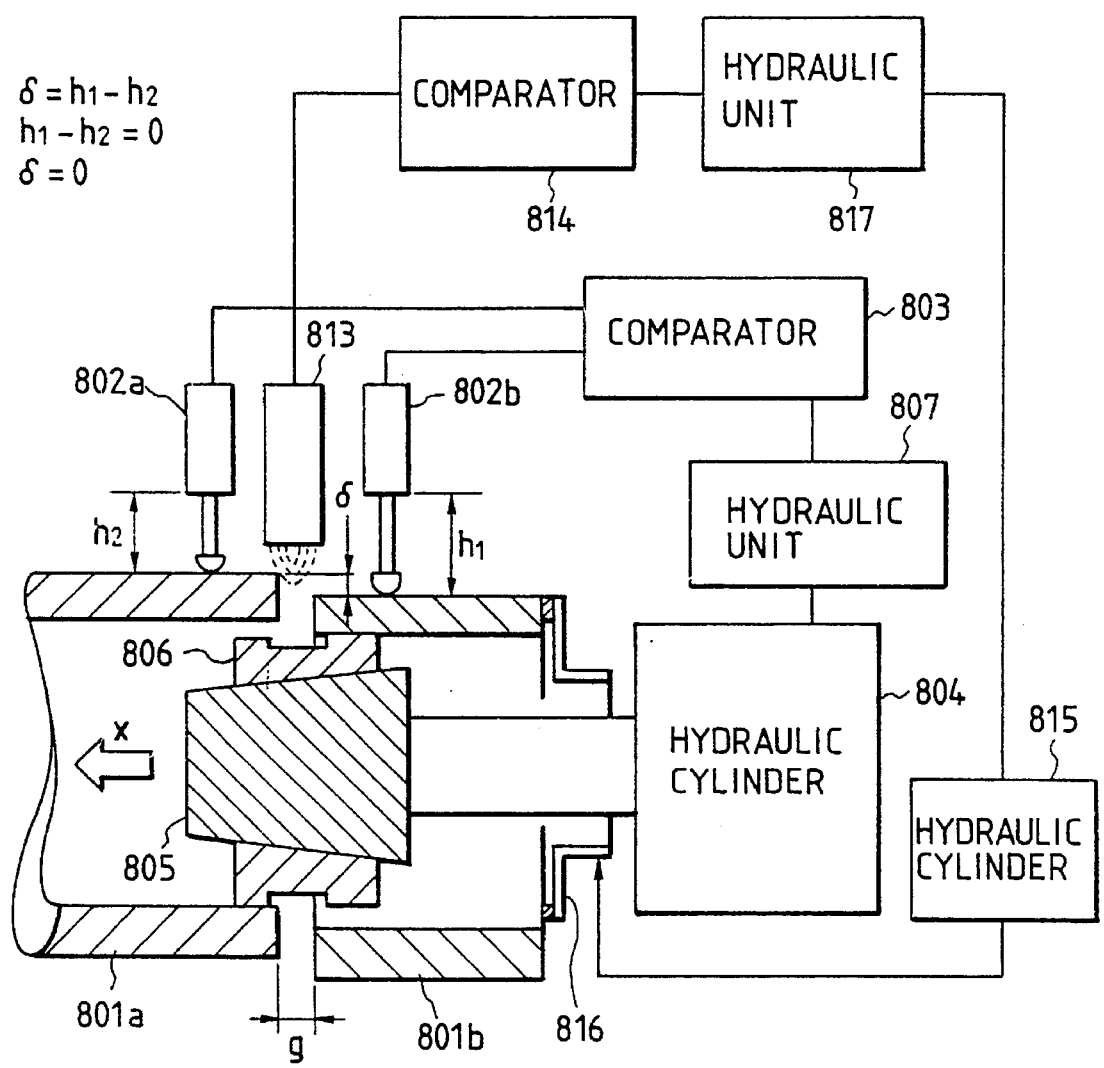
FIG. 22 illustrates a dislocation measuring method of an edge aligning mechanism according to the present invention.

As shown in FIG. 22, a pipe expanding rod 805 and a pipe expanding piece 806, which are used to eliminate dislocation between pipes, are inserted in the interior of pipes 801a, 801b to be welded, and height sensors 802a, 802b are provided above the outer circumferential surfaces of the pipes 801a, 801b. The signal lines of the height sensors 802a, 802b are connected to a comparator 803, a signal line of which is connected to a hydraulic cylinder 804 via a hydraulic unit 807. The data concerning the heights $h_2$, $h_1$ of the pipes 801a, 801b, the workpieces the edges of which are to be aligned are sent to the comparator 803, in which a difference $\delta$ between $h_1$ and $h_2$ is calculated. The result of the calculation is transmitted to the hydraulic unit 807 to operate the hydraulic cylinder 804. Consequently, the pressure in the hydraulic cylinder increases to cause the tapering rod 805 and pipe expanding piece 806 to be operated, so that the pipes 801a, 801b are subjected alignment operations. During this operation, the height sensors 802a, 802b conduct measurement moment by moment and output signals representative of the results of the measurement to the comparator 803. This operation is carried out until the difference $\delta$ becomes zero. When the difference $\delta$ becomes zero, the alignment operations are stopped to complete the elimination of the dislocation or misalignment between the pipes.

To enable a measurement of the gap between the opposed edges of a pipe, a flange and a gap eliminating mechanism is provided which includes a gap sensor 813 set in a position above the outer circumferential surfaces of the opposed edge portions of pipes 801a and 801b, workpieces to be welded together, and a signal line of the gap sensor is connected to a comparator 814 so as to drive a hydraulic cylinder 815 through a hydraulic unit 817. A push head 816 is fixed to the front portion of the hydraulic cylinder 815. A gap g between the pipes 801a and 801b, is measured at the gap sensor 813, and the data on this measurement are transmitted to the comparator 814. The hydraulic cylinder 815 is operated through the hydraulic unit 817 as the gap g is measured, to move the push head 816 in the X-direction, whereby the gap g can be eliminated. According to this embodiment, the alignment of the opposed edges can be carried out automatically when a pipe and a pipe, or a pipe and flange are butt welded together. Therefore, this embodiment produces a large effect when it is applied to a laser welding system.

Next, the operations of the laser machining system according to the present invention will be described with reference to FIG. 16.

Figure 23A:
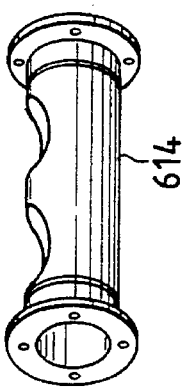
FIGS. 23a–23c are schematic views of the steps of attaching the trunk pipe and the flanges.
Figure 23B:
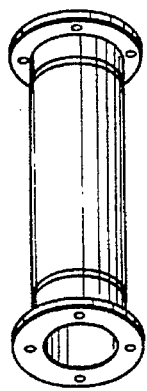
Figure 23C:
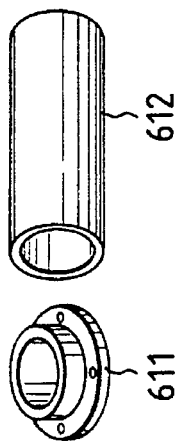

The present system is directed to the case, in which the trunk pipe forming the bus and the flange to be used in the gas insulation control system are to be welded or in which the trunk pipe is to be bored for branching. Usually, the bus is used to join the trunk pipe 503 and the flange 505 machined, and the trunk pipe 503 is then machined to have a bore for branch pipe, as shown in FIGS. 23a, 23b and 23c. These machining operations are continuously accomplished with the laser beam by using the present system.

First of all, the trunk pipe 503 is carried on and conveyed by the conveyor truck 502 in the direction $x_1$ until it is positioned and stopped at the center of the flange assembling apparatus 506. At this time, the flange assembling apparatus 506 has its table surface directed upward. The flanges conveyed by the flange conveyors 504 are grasped on the table surface of the flange assembling apparatus and are caused to clamp the trunk pipe 503 and turned at 90 degrees so that they are assembled with the trunk pipe 503. The trunk pipe 503 and the flanges 505 thus assembled are conveyed by the aforementioned conveyor truck 502 to the positions just below the welding head 508a and are positioned at the center portion of the positioning apparatus 507 for the pipe expanding, width adjusting and rotating operations. In this positioning apparatus 507, the pipe expanding head is inserted from the two sides of the flange 505 to effect the expansion and positioning to predetermined sizes. After this, the trunk pipe 503 and the flanges 505 are butt-welded by the laser beam coming from the welding head 508a. After the end of the welding of the two ends of the trunk pipe 503, the laser beam is switched from the welding head to the cutting head 508b to bore the trunk pipe 503. The flanged trunk pipe thus bored is carried again on the conveyor truck 507 and conveyed to the subsequent step.

According to the present invention, as has been described in various manners, the conveyance, positioning, rotations and expansions of the workpiece can be automated in series when the tubular container composed of the trunk pipe and the flanges is to be manufactured as in the bus of the gas insulation control apparatus. As a result, the production cost can be drastically reduced while using one laser oscillator for the welding and boring operations interchangeably. Thus, it is possible to manufacture a tubular container having little thermal deformation.

According to the machining apparatus of the present embodiment, moreover, the plural machining heads are arranged on the circumference concentric with the pivot of the rotary disc, and the base of the rotary drive system is reliably fixed. As a result, it is possible at the time of indexing rotation to align the optical axis of the laser beam reflected by the bend mirror and the optical axis of the optical system of the machining heads so that the laser beam can be prevented from coming out of focus. Since the machining head left unused is protected by the dust cover, the optical system can be protected against the dust to invite no trouble at the time of beam condensation.

According to the positioning device of the present invention, all the pipe expanding cores for expanding the trunk pipe from the inside are uniformly moved in the radial directions by the transverse movement of the taper rod so that the deformed pipe can be corrected to have a true circle. Furthermore, the transverse drive source of the taper rod can retain the size of the expanded pipe as it is, if a pilot check valve is disposed in the hydraulic cylinder and its oil pressure circuit. Then, the size is not changed in the welding operation. If a relief valve in the oil pressure circuit is used, no hydraulic motor is damaged, even if it is used as the width adjusting drive source and pressurized even with the grooves of the tubes being contacting with each other.

Figure 24:
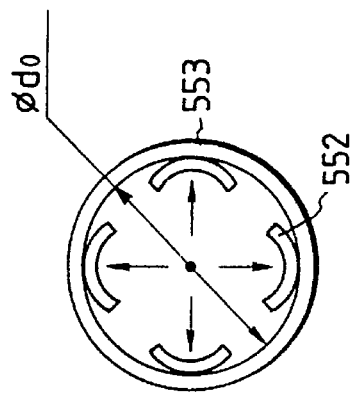
FIG. 24 is a view taken along the line XXIV—XXIV in FIG. 17.
Figure 25:
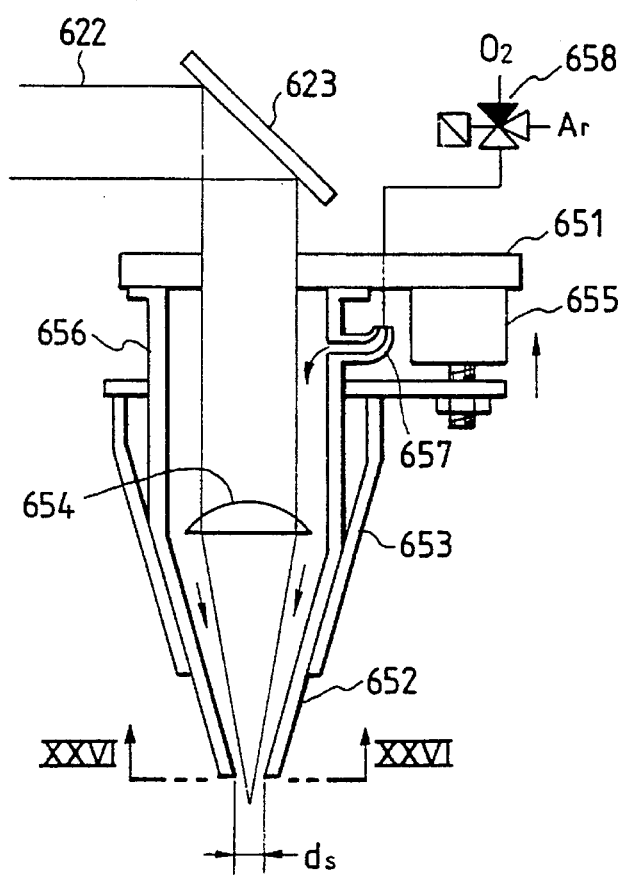
FIG. 25 is a schematic view of the machining system of the present invention with a small aperture.
Figure 26:
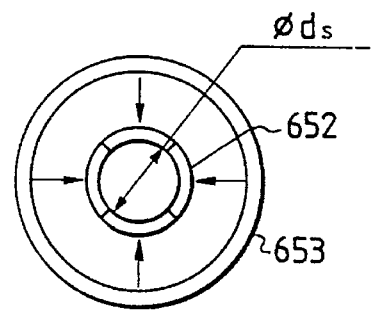
FIG. 26 is a view taken in the direction of the line XXVI—XXVI in FIG. 25.

In the embodiment of FIGS. 24–26, as shown a base for supporting the machining head is equipped on its lower face with the nozzle 652 having a variable aperture for spraying the shield gas and the guide 653 for adjusting the diameter of the nozzle 652. The condenser lens 654 is disposed in the aperture-variable nozzle 652, and the guide 653 is connected to an air cylinder 655 for moving guide 653 vertically.

On other hand, a nozzle body 656 above the nozzle 652 is formed with a shield gas introduction port 657 which has its leading end connected with a three-way electromagnetic valve 658 for interchanging the gases.

The laser beam 622 emitted from the laser oscillator is deflected by the bend mirror 623 into the condenser lens 654 of the machining head. The aperture-variable nozzle 652 has its tip divided, as shown in FIG. 24. At the lowermost position of the air cylinder 655, the guide 653 also takes its lowermost position so that the maximum opening $\phi d_o$ is obtained by the spring action of the aforementioned nozzle 652. When the air cylinder 655 is moved to the uppermost position, on the other hand, the guide 653 constricts the opening of the nozzle 652 to the minimum opening $\phi d_s$, as shown in FIG. 26. In the maximum opening state, $O_2$ gases, for example, can be introduced into the nozzle 652 by opening one of the inputs of the three-way electromagnetic valve 658. In the minimum opening state, Ar gases can be introduced by opening another input of the three-way electromagnetic valve 658.

As has been described hereinbefore, by changing the nozzle diameter of the machining head in accordance with the application (for the welding or cutting operation) and by interchanging the kinds of the gases to be sprayed, the cutting and welding operations with the laser can be accomplished with one head. By the introduction into the laser machining system, moreover, a laser composite machining system can be realized.

To most buses of a gas insulation control apparatus, there are connected not only the flanges but also the branch pipes. Then, the system corresponds to the case in which the cutting and flange-welding of the end faces of the branched pipe are accomplished by the use of the laser beam.

Figure 27:
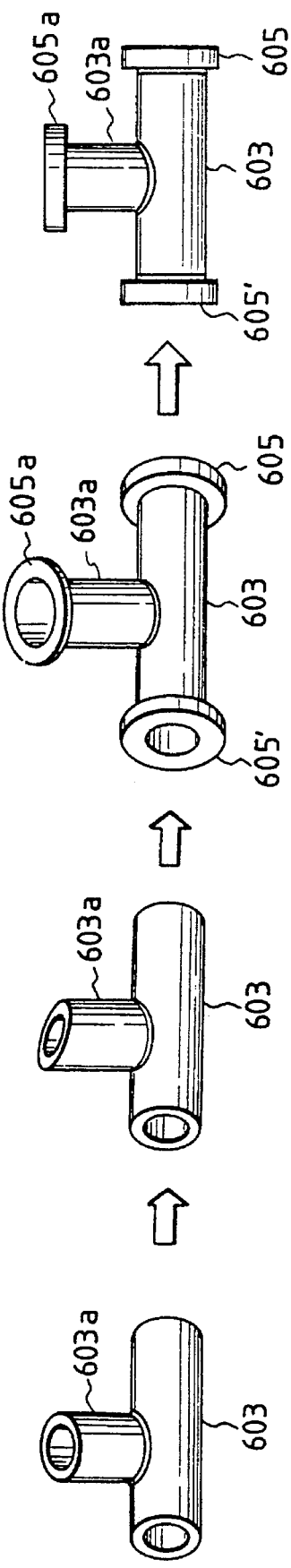
FIGS. 27a–27d are perspective views of the machining steps when the flanges are to be attached to the branch trunk pipe.

First of all, the machining process will be schematically described with reference to FIGS. 27a to 27d. The trunk pipe 603 having a branch pipe 603a welded thereto in advance (as shown in FIG. 27a) has its pipe end face cut with the laser beam, as shown in FIG. 27b. After this, flanges 605, 605' and 605a are assembled to the ends of the trunk pipe 603 and the branch pipe 603a, as shown in FIG. 27c. After this, the individual flanges 605, 605' and 605a are welded to the individual pipes 603 and 603a by the use of the laser beam, as shown in FIG. 12d.

Figure 28:
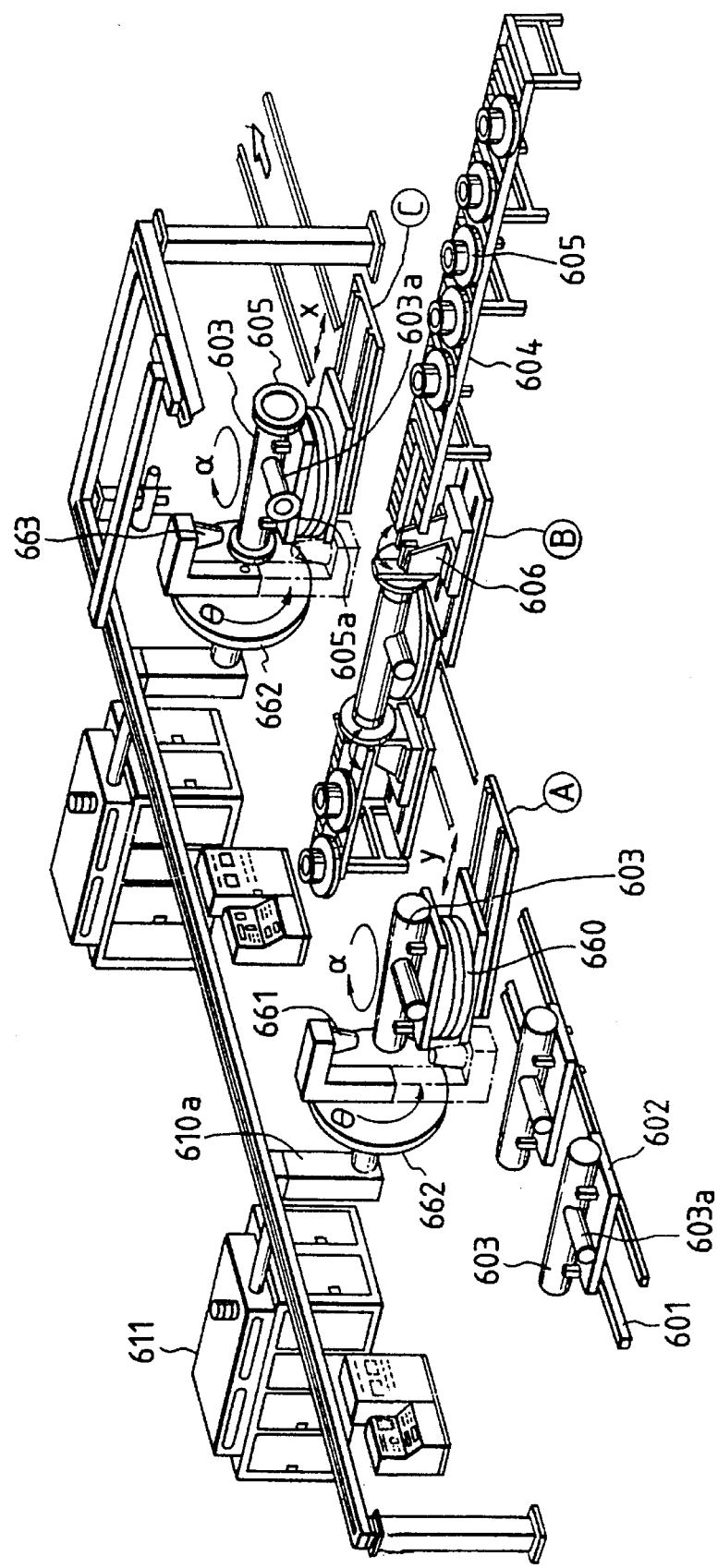
FIG. 28 is a perspective view of another embodiment of a laser machining system constructed in accordance with the present invention.

As shown in FIG. 28, the trunk pipe 603, having the branch pipe 603a arc-welded in advance thereto, is conveyed by the conveyor truck 602 on the conveyor rails 601 to a cutting station Ⓐ generally constructed of a turntable 660 which can be moved in the y direction and rotated in a direction of a while carrying the branched trunk pipe 603, and a swivel table 662 which is connected to the laser oscillator 611 through a beam guide 610a and can be rotated in a direction Θ while carrying a cutting head 661. Then, the turntable 660 is turned to bring the end of the trunk pipe 603 or the branch pipe 603a to the cutting position, in which the swivel table 662 is rotated while radiating the laser beam from the cutting head 661 to cut the pipe end. When the two ends of the trunk pipe 603 and the end of the branch pipe 603a are cut away, the workpieces are conveyed to a flange assembling station Ⓑ constructed substantially similar to that of the flange assembling apparatus described with reference to FIG. 16. The trunk pipe 603 having its two ends and its branch pipe 603a assembled with the flanges 605 at the flange assembling station Ⓑ is conveyed to a welding station Ⓒ for a subsequent step. If, in this case, the trunk pipe 603 and the branch pipe 603a have an equal diameter, they can be individually assembled with the flanges 605 on the two conveyors. If the branch pipe 603a has a diameter less than that of the trunk pipe 603, these two pipes can be assembled with the individual flanges by causing one conveyor to carry the flanges having a diameter matching the diameter of the trunk pipe 603 and the other conveyor to carry a flange having a diameter matching the diameter of the branch pipe 603a. The welding station Ⓒ has a structure substantially similar to that of the cutting station Ⓐ, except that it is equipped with a welding head 663 on the swivel table 662 in place of the cutting head. Moreover, the trunk pipe 603 or the branch pipe and the flanges 605 and 605a are welded while being irradiated with the laser beam of the laser oscillator 11 from the welding head 663 by rotating the swivel table 662.

According to the present invention, the machining can be accomplished at the unit of each member so that the flanges can be welded without any consideration into the thermal deformation which might otherwise be caused in the mark welding. Moreover, a machining operation using a large machine after the laser welding is not required to reduce the production cost drastically. Furthermore, the composite machining system using the laser can be produced.

While, in the foregoing embodiments, the laser oscillator has been described at being provided for the cutting station and the welding station it is understood that the laser oscillator may be shared between the two stations.

We claim:

1. A machining head comprising: a generally cylindrical nozzle for guiding a laser beam from a laser oscillator in the vicinity of a workpiece to be machined; a condensing lens disposed midway in said nozzle for condensing said laser beam to irradiate said workpiece with the condensed laser beam; and shield gas introducing means for introducing a shield gas which is used to shield the laser beam in said nozzle against a wall surface and which is to be sprayed to said workpiece while guiding said laser beam, wherein said nozzle has its tip divided circumferentially such that divided sectors thereof are radially extendible and contractible.

2. A matching head comprising: a generally cylindrical nozzle for guiding a laser beam from a laser oscillator in the vicinity of a workpiece to be machined; a condensing lens disposed midway in said nozzle for condensing said laser beam to irradiate said workpiece with the condensed laser beam; shield gas introducing means for introducing a shield gas which is used to shield the laser beam in said nozzle against a wall surface and which is to be sprayed to said workpiece while guiding said laser beam; and a guide in the form of a nozzle arranged around the outer circumference of the first-named nozzle and made vertically movable while being guided by the outer wall of the first-named nozzle such that said nozzle has its tip aperture made variable by the vertical movements of said guide.

3. A machining head as set forth in claim 2, wherein said guide further includes a vertical drive mechanism for moving said nozzle of the guide upward and downward.

4. A machining head comprising: a generally cylindrical nozzle for guiding a laser beam from a laser oscillator in the vicinity of a workpiece to be machined; a condensing lens disposed midway in said nozzle for condensing said laser beam to irradiate said workpiece with the condensed laser beam; and shield gas introducing means for introducing a shield gas which is used to shield the laser beam in said nozzle against a wall surface and which is to be sprayed to said workpiece while guiding said laser beam, wherein said nozzle has its tip divided circumferentially such that divided sectors thereof are radially extendible and contractible, and, and wherein said shield gas introducing means includes a switch mechanism for switching the shield gas to be introduced in accordance with the machining application of said workpiece.

5. A laser machining system comprising: first conveyor means for conveying a trunk pipe having a branch pipe fixed in advance to its predetermined portion; a cutting station for cutting the branched trunk pipe conveyed by said conveyor means; a flange assembling station for assembling each of these ends of said branched trunk pipe conveyed by said first conveyor means, which were cut at said cutting station, with the flange which is conveyed by second conveyor means arranged generally at a right angle with respect to said first conveyor means; and a welding station for welding each of those ends of the branched trunk pipe conveyed by said first conveyor means, which were assembled with a flange at said flange assembling station, and the flange-assembled portion of the same with a laser beam, wherein said cutting station includes: rails arranged generally at a right angle with respect to the conveyance direction of said first conveyor means; a turntable made movable on said rails in a direction perpendicular to the conveyance direction of said first conveyor means and turntable in a horizontal direction; and a swivel table having a swivel axis aligned generally with the center axis of said branched trunk pipe to be cut on said turntable, so that said swivel table can swing on said swivel axis at a right angle with respect to the turning direction of said turntable, said swivel table including a cutting head for radiating a laser beam coming from a laser oscillator so as to cut each of the ends of said branched trunk pipe.

6. A laser machining system comprising: first conveyor means for conveying a trunk pipe having a branch pipe fixed in advance to its predetermined portion; a cutting station for cutting the branched trunk pipe conveyed by said conveyor means; a flange assembling station for assembling each of these ends of said branched trunk pipe conveyed by said first conveyor means, which were cut at said cutting station, with the flange which is conveyed by second conveyor means arranged generally at a right angle with respect to said first conveyor means; and a welding station for welding each of those ends of the branched trunk pipe conveyed by said first conveyor means, which were assembled with a flange at said flange assembling station, and the flange-assembled portion of the same with a laser beam, wherein said welding station includes: rails arranged generally at a right angle with respect to the conveyance direction of said first conveyor means; a turntable made movable on said rails in a direction perpendicular to the conveyance direction of said first conveyor means and turntable in a horizontal direction; and a swivel table having a swivel axis aligned generally with the center axis of the flange-assembled branched trunk pipe to be welded on said turntable, so that said swivel table can swing on said swivel axis at a right angle with respect to the turning direction of said turntable, said swivel table including a welding head for radiating a laser beam coming from a laser oscillator so as to weld each of the ends of said branched trunk pipe and said flange.

7. A machining head comprising: a generally cylindrical nozzle for guiding a laser beam from a laser oscillator in the vicinity of a workpiece to be machined; a condensing lens disposed midway in said nozzle for condensing said laser beam to irradiate said workpiece with the condensed laser beam; shield gas introducing means for introducing a shield gas which is used to shield the laser beam in said nozzle against a wall surface and which is to be sprayed to said workpiece while guiding said laser beam; and a guide in the form of a nozzle arranged around the outer circumference of the first-named nozzle and made vertically movable while being guided by the outer wall of the first-named nozzle such that said nozzle has its tip aperture made variable by the vertical movements of said guide, and wherein said shield gas introducing means including a switch mechanism for switching the shield gas to be introduced in accordance with the machining application of said workpiece.

* * * * *